(12) United States Patent
Zhang et al.

(10) Patent No.: US 9,800,959 B2
(45) Date of Patent: Oct. 24, 2017

(54) OPTICAL SWITCHING APPARATUS

(71) Applicant: Huawei Technologies Co., Ltd., Shenzhen (CN)

(72) Inventors: Chunhui Zhang, Wuhan (CN); Peng Zhang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/192,801

(22) Filed: Jun. 24, 2016

(65) Prior Publication Data

US 2016/0309243 A1    Oct. 20, 2016

Related U.S. Application Data

(63) Continuation of application No. PCT/CN2014/083544, filed on Aug. 1, 2014.

(30) Foreign Application Priority Data

Dec. 25, 2013  (CN) .......................... 2013 1 0726630

(51) Int. Cl.
    *H04J 14/00*  (2006.01)
    *H04Q 11/00*  (2006.01)
    *H04J 14/02*  (2006.01)

(52) U.S. Cl.
    CPC .......... *H04Q 11/0005* (2013.01); *H04J 14/02* (2013.01); *H04Q 2011/0011* (2013.01);
    (Continued)

(58) Field of Classification Search
    CPC ....... H04Q 11/0005; H04Q 2011/0016; H04Q 11/0062; H04Q 2011/0024;
    (Continued)

(56) References Cited

U.S. PATENT DOCUMENTS 6,366,716 B1    4/2002  Graves
6,570,873 B1 *  5/2003  Isoyama ............... H04L 47/522
                                                370/375

(Continued)

FOREIGN PATENT DOCUMENTS

CN    1642061 A     7/2005
CN    1909741 A     2/2007
CN    101667879 A   3/2010
CN    102318363 A   1/2012
CN    102740177 A   10/2012

*Primary Examiner* — Don N Vo
(74) *Attorney, Agent, or Firm* — Slater Matsil, LLP

(57) ABSTRACT

An apparatus includes an input port group, which includes multiple input slots, and multiple input ports are provided in each input slot. An input allocation matrix includes multiple first optical switches, and an input port of the first optical switch is connected to an input port of the input slot. A cross-connect matrix includes multiple second optical switches, and an output port of the first optical switch is connected to an input port of the second optical switch. An output allocation matrix includes multiple third optical switches, and an input port of the third optical switch is connected to an output port of the second optical switch. An output port group includes multiple output slots, multiple output ports are provided in each output slot, and an output port of the output slot is connected to an output port of the third optical switch.

20 Claims, 10 Drawing Sheets

(52) U.S. Cl.
CPC .............. *H04Q 2011/0016* (2013.01); *H04Q 2011/0024* (2013.01); *H04Q 2011/0056* (2013.01); *H04Q 2011/0058* (2013.01); *H04Q 2213/1301* (2013.01)

(58) Field of Classification Search
CPC ....... H04Q 2011/0052; H04Q 11/0071; H04Q 2011/0011; H04J 14/0284; H04J 14/0212; H04J 14/0227; H04J 14/0241; H04J 14/0213; H04J 14/02; H04J 14/022; H04J 14/0267
USPC .......................................................... 398/50
See application file for complete search history.

(56) References Cited

U.S. PATENT DOCUMENTS

| | | | |
|---|---|---|---|
| 9,282,384 B1* | 3/2016 | Graves | H04Q 11/0005 |
| 2002/0015551 A1 | 2/2002 | Tsuyama et al. | |
| 2002/0044718 A1 | 4/2002 | Nishi et al. | |
| 2005/0152351 A1 | 7/2005 | Wang et al. | |
| 2005/0213875 A1* | 9/2005 | Sugitani | H04J 14/0294 385/16 |
| 2006/0056848 A1* | 3/2006 | Nishi | H04Q 11/0005 398/45 |
| 2006/0098981 A1* | 5/2006 | Miura | H04Q 11/0005 398/45 |
| 2012/0201536 A1 | 8/2012 | Liu et al. | |
| 2014/0140697 A1 | 5/2014 | Cao | |

\* cited by examiner

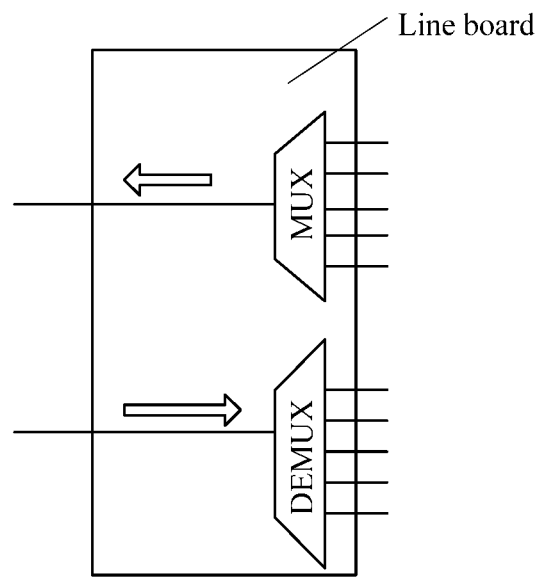
FIG. 3-a
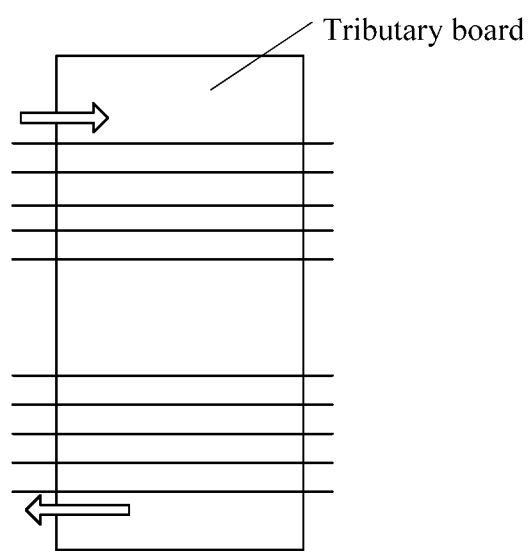
FIG. 3-b

| Input allocation matrix / N groups of input ports / Input port group | 1 | 2 | 3 | 4 | ... | | | N |
|---|---|---|---|---|---|---|---|---|
| 1 | 1 | 2 | 3 | 4 | ... | | | N |
| 2 | N | 1 | 2 | 3 | 4 | ... | | N-1 |
| 3 | N-1 | N | 1 | 2 | 3 | 4 | ... | N-2 |
| ... | | | | | | | | |
| N | 2 | 3 | 4 | ... | N-2 | N-1 | N | 1 |

FIG. 6

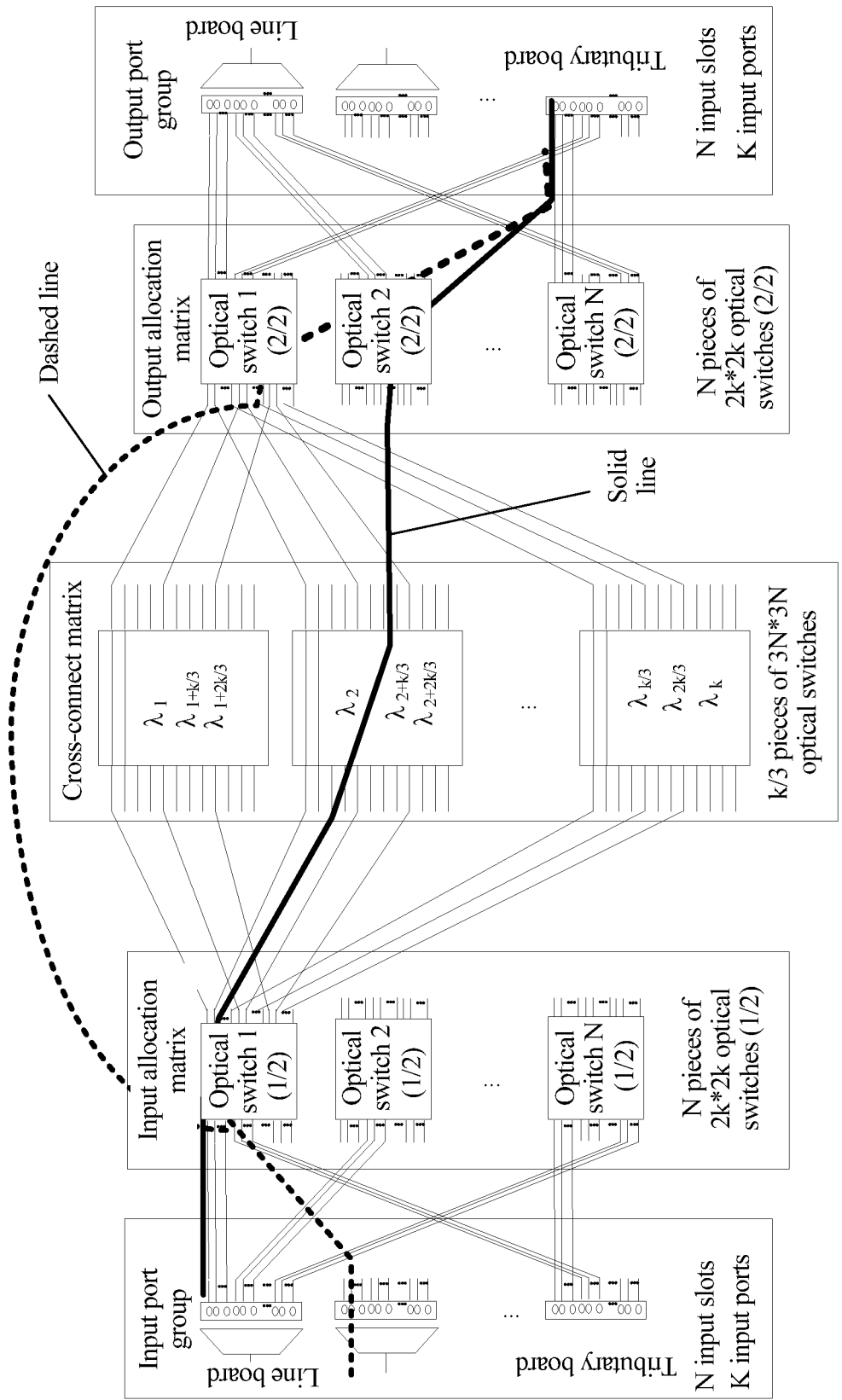
FIG. 7-a

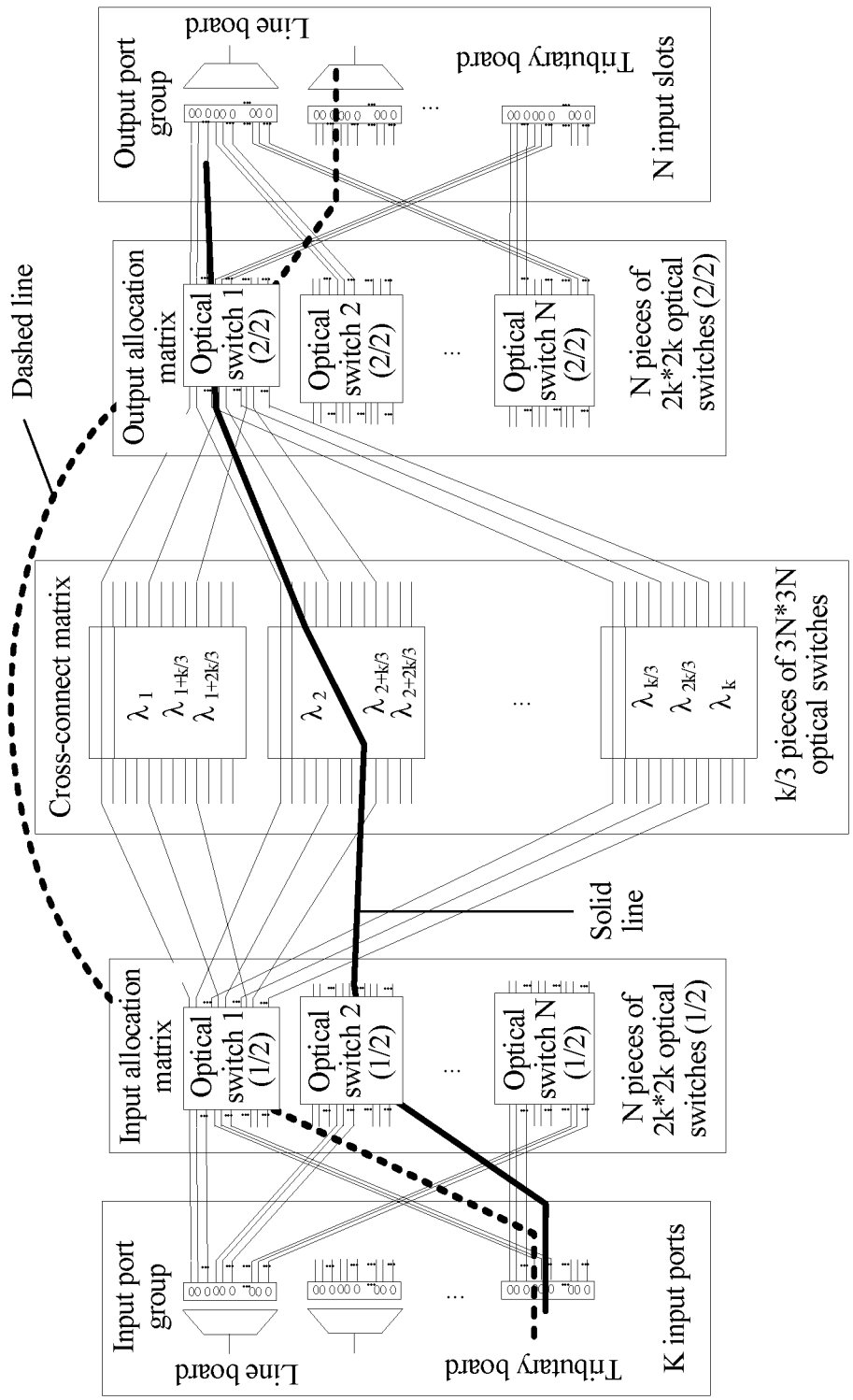
FIG. 7-b

OPTICAL SWITCHING APPARATUS

CROSS-REFERENCE TO RELATED APPLICATIONS

This application is a continuation of International Patent Application No. PCT/CN2014/083544, filed on Aug. 1, 2014, which claims priority to Chinese Patent Application No. 201310726630.2, filed on Dec. 25, 2013, which applications are hereby incorporated herein by reference.

TECHNICAL FIELD

The present disclosure relates to the field of communications technologies, and in particular embodiments, to an optical switching apparatus.

BACKGROUND

Dense wavelength division multiplexing (DWDM) is a technology that combines a group of optical wavelengths for transmission over one fiber. This technology can increase bandwidth of an existing fiber backbone network, and in a case in which a given information transmission capacity is unchanged, a total quantity of required fibers can be reduced.

As requirements on throughputs of switching nodes on a metropolitan area network and a backbone network in a wavelength division multiplexing (WDM) optical network become higher, the speed of a single wavelength also becomes higher. After a coherence technology is introduced, complexity and costs of a wavelength adding/dropping and wavelength conversion device increase sharply. Therefore, an optical cross-connect node needs to use a wavelength adding/dropping and wavelength conversion structure shared in multiple dimensions. In a used large-scale optical switch, wavelengths in each dimension are expanded, and switching and adding/dropping are performed in the optical switch, so that sharing of wavelength adding/dropping and wavelength conversion may be implemented. However, due to process difficulty of a large-scale optical switch, a quantity of optical switch ports in the industry far cannot satisfy requirements of the backbone network. In addition, by using a combination of some small optical switches, wavelength adding/dropping and wavelength conversion may also be shared in multiple dimensions.

An optical switching method based on a wavelength plane is available in the prior art. WDM light from various dimensions is separated through wavelength division demultiplexing, and then a same wavelength is sent to a same small switch (that is, a wavelength plane). Light of each wavelength is groomed in a respective wavelength plane. After grooming is complete, the WDM light in each dimension is multiplexed. In each wavelength plane, particular input and output ports are reserved for wavelength adding/dropping and wavelength conversion, and the reserved ports are connected to a wavelength conversion switch. The wavelength conversion switch also reserves particular ports for wavelength adding/dropping. When a wavelength needs to be dropped, the wavelength enters the wavelength conversion switch from a reserved output port of a corresponding wavelength plane, and then is output from the wavelength conversion switch to a wavelength dropping port. When a wavelength needs to be added, the wavelength is added from a wavelength adding port of the wavelength conversion switch, sent to a corresponding wavelength plane through the wavelength conversion switch, and switched in the corresponding wavelength plane to a target dimension. When a wavelength needs to be converted, the wavelength is dropped from a reserved port of a corresponding wavelength plane and arrives at the wavelength conversion switch, and after wavelength conversion is complete, is switched to a target wavelength plane, and then groomed to a corresponding wavelength plane.

In the foregoing optical switching method based on a wavelength plane, because particular ports need to be reserved in each wavelength plane for wavelength adding/dropping, when a proportion of wavelength adding/dropping to wavelength conversion is relatively high, a case in which a particular wavelength needs to be completely added or completely dropped is likely to occur. Therefore, a sufficient number of ports need to be reserved in each wavelength plane, and correspondingly, the wavelength conversion switch also needs to have a large quantity of ports. If an optical switch is used for implementation, it is difficult to implement this according to a process in the industry. However, if the quantity of reserved ports in each wavelength plane is relatively small, a packet loss is likely to be caused. In addition, the ports in the wavelength plane are fixedly used for wavelength grooming, but the ports in the wavelength conversion switch can be fixedly used only for wavelength adding/dropping and wavelength conversion. Therefore, if there are too many ports in the wavelength conversion switch, resource waste is likely to be caused, and flexibility is poor.

SUMMARY

Embodiments of the present invention provide an optical switching apparatus, so as to implement sharing of wavelength adding/dropping and wavelength conversion ports, improve utilization of port resources, and reduce a packet loss rate.

To resolve the foregoing technical problem, the embodiments of the present invention provide the following technical solutions.

According to a first aspect, the embodiments of the present invention provide an optical switching apparatus, where the optical switching apparatus includes an input port group, an input allocation matrix, a cross-connect matrix, an output allocation matrix, and an output port group. In the first aspect, the following are provided.

The input port group includes multiple input slots, multiple input ports are provided in the input slot, and the input slot is configured to input optical signals in each dimension, or configured to input an optical signal that requires wavelength adding, or configured to input an optical signal obtained after wavelength conversion.

The input allocation matrix is connected to the input port group in fiber cross-connection mode, the input allocation matrix includes multiple first optical switches, and an input port of the first optical switch is connected to an input port of the input slot.

The cross-connect matrix includes multiple second optical switches, the second optical switch corresponds to one or more wavelengths, and an input port of the second optical switch is connected to an output port of the first optical switch.

The output allocation matrix includes multiple third optical switches, and an input port of the third optical switch is connected to an output port of the second optical switch.

The output port group is connected to the output allocation matrix in fiber cross-connection mode, the output port group includes multiple output slots, multiple output ports are provided in the output slot, an output port of the output slot is connected to an output port of the third optical switch, and the output slot is configured to output optical signals in each dimension, or configured to output an optical signal that requires wavelength dropping, or configured to output an optical signal that requires wavelength conversion.

In an implementation of the first aspect, the input allocation matrix being connected to the input port group in fiber cross-connection mode includes the following: the input ports of the input slot are grouped into multiple groups, each group of input ports is connected to each first optical switch of the input allocation matrix, and the multiple groups of input ports are respectively connected to each first optical switch of the input allocation matrix in interlacing mode. The output port group being connected to the output allocation matrix in fiber cross-connection mode includes the following: the output ports of the output slot are grouped into multiple groups, each group of output ports is connected to each third optical switch of the output allocation matrix, and the multiple groups of output ports are respectively connected to each third optical switch of the output allocation matrix in interlacing mode.

In an implementation of the first aspect, the multiple input slots included in the input port group are classified into two types: a first type of input slot and a second type of input slot, where the first type of input slot is configured to input an optical signal that requires dimensional grooming, and the second type of input slot is configured to input an optical signal that requires wavelength adding or an optical signal obtained after wavelength conversion. Furthermore, the multiple output slots included in the output port group are classified into two types: a first type of output slot and a second type of output slot, where the first type of output slot is configured to output an optical signal that requires dimensional grooming, and the second type of output slot is configured to output an optical signal that requires wavelength dropping or an optical signal that requires wavelength conversion.

In an implementation of the first aspect, the second type of input slot includes a wavelength adding input slot and a conversion input slot, where the wavelength adding input slot is configured to input an optical signal that requires wavelength adding, and the conversion input slot is configured to input an optical signal obtained after wavelength conversion. Furthermore, the second type of output slot includes a wavelength dropping output slot and a conversion output slot, where the wavelength dropping input slot is configured to output an optical signal that requires wavelength dropping, and the conversion output slot is configured to output an optical signal that requires wavelength conversion.

In an implementation of the first aspect, when the second optical switch corresponds to M wavelengths, M fibers are used to connect ports of the second optical switch and ports of the first optical switch, where the M is a non-zero natural number.

In an implementation of the first aspect, the first optical switch of the input allocation matrix and the third optical switch of the output allocation matrix are a same optical switch, the input port of the first optical switch and the output port of the third optical switch are an input port of the same optical switch, and the output port of the first optical switch and the input port of the third optical switch are an output port of the same optical switch.

In an implementation of the first aspect, every T second optical switches in the multiple second optical switches of the cross-connect matrix are combined into one optical switch, each first optical switch in the multiple first optical switches of the input allocation matrix is split into T optical switches, and each split optical switch is connected to each combined optical switch, where the T is a non-zero natural number.

In an implementation of the first aspect, the input port group includes N input slots, and K input ports are provided in each input slot, where 2N/3 input slots are configured to input optical signals in each dimension, and N/3 input slots are configured to input an optical signal that requires wavelength adding or an optical signal obtained after wavelength conversion, where the N and K are both non-zero natural numbers. Additionally, the input allocation matrix includes N first optical switches, an input port quantity of the first optical switch is 2K, an output port quantity of the first optical switch is 2K, and the 2K input ports of each input slot are connected to input ports of the N first optical switches. Furthermore, the cross-connect matrix includes K/3 second optical switches, an input port quantity of the second optical switch is 3N, an output port quantity of the second optical switch is 3N, each second optical switch corresponds to three wavelengths, and the 2K output ports of each first optical switch are connected to the K/3 second optical switches. In addition, the output allocation matrix includes N third optical switches, an input port quantity of the third optical switch is 2K, an output port quantity of the third optical switch is 2K, and the 2K input ports of each third optical switch are connected to the K/3 second optical switches; and the output port group includes N output slots, K output ports are provided in each output slot, the K output ports of each output slot are connected to the N third optical switches, 2N/3 output slots are configured to output optical signals in each dimension, and N/3 output slots are configured to output an optical signal that requires wavelength dropping or an optical signal that requires wavelength conversion.

In an implementation of the first aspect, two adjacent second optical switches in the K/3 second optical switches included in the cross-connect matrix are combined into one optical switch, each combined optical switch corresponds to six wavelengths, each first optical switch in the N first optical switches included in the input allocation matrix is split into two optical switches, and each split optical switch is connected to each combined optical switch.

In an implementation of the first aspect, the input port group includes N input slots, and K input ports are provided in each input slot, where N/2 input slots are configured to input optical signals in each dimension, and N/2 input slots are configured to input an optical signal that requires wavelength adding or an optical signal obtained after wavelength conversion, where the N and K are both non-zero natural numbers. In addition, the input allocation matrix includes N first optical switches, an input port quantity of the first optical switch is K, an output port quantity of the first optical switch is K, and the K input ports of each input slot are connected to input ports of the N first optical switches. Furthermore, the cross-connect matrix includes K/2 second optical switches, an input port quantity of the second optical switch is 2N, an output port quantity of the second optical switch is 2N, each second optical switch corresponds to two wavelengths, and the K output ports of each first optical switch are connected to the K/2 second optical switches. Even further, the output allocation matrix includes N third optical switches, an input port quantity of the third optical switch is K, an output port quantity of the third optical switch is K, and the K input ports of each third optical switch are connected to the K/2 second optical switches; and the output port group includes N output slots, K output ports are provided in each output slot, the K output ports of each output slot are connected to the N third optical switches, N/2 output slots are configured to output optical signals in each dimension, and N/2 output slots are configured to output an optical signal that requires wavelength dropping or an optical signal that requires wavelength conversion.

In an implementation of the first aspect, that the input allocation matrix is connected to the input port group in fiber cross-connection mode includes the following.

The input port group includes N input slots, the N input slots are respectively a first input slot, a second input slot, . . . , an $N^{th}$ input slot, K input ports in each input slot are grouped into N groups, the N groups of input ports in each input slot are respectively a first group of input ports, a second group of input ports, . . . , an $N^{th}$ group of input ports, and each group of input ports includes K/N input ports; N first optical switches of the input allocation matrix are respectively a first one of the first optical switches, a second one of the first optical switches, . . . , an $N^{th}$ one of the first optical switches, where the N and K are both non-zero natural numbers.

For the first input slot, the first group of input ports of the first input slot is connected to the first one of the first optical switches, the second group of input ports of the first input slot is connected to the second one of the first optical switches, . . . , the $N^{th}$ group of input ports of the first input slot is connected to the $N^{th}$ one of the first optical switches.

For the second input slot, the first group of input ports of the second input slot is connected to the second one of the first optical switches, the second group of input ports of the second input slot is connected to the third one of the first optical switches, . . . , the $(N-1)^{th}$ group of input ports of the second input slot is connected to the $N^{th}$ one of the first optical switches, and the $N^{th}$ group of input ports of the second input slot is connected to the first one of the first optical switches.

For the $N^{th}$ input slot, the first group of input ports of the $N^{th}$ input slot is connected to the $N^{th}$ one of the first optical switches, the second group of input ports of the $N^{th}$ input slot is connected to the first one of the first optical switches, . . . , the $(N-1)^{th}$ group of input ports of the second input slot is connected to the $(N-2)^{th}$ one of the first optical switches, and the $N^{th}$ group of input ports of the second input slot is connected to the $(N-1)^{th}$ one of the first optical switches.

In an implementation of the first aspect, the output port group being connected to the output allocation matrix in fiber cross-connection mode includes the following.

The output port group includes N output slots, the N output slots are respectively a first output slot, a second output slot, . . . , an $N^{th}$ output slot, K output ports in each output slot are grouped into N groups, the N groups of output ports in each output slot are respectively a first group of output ports, a second group of output ports, . . . , an $N^{th}$ group of output ports, and each group of output ports includes K/N output ports; N third optical switches of the output allocation matrix are respectively a first one of the third optical switches, a second one of the third optical switches, . . . , an $N^{th}$ one of the third optical switches, where the N and K are both non-zero natural numbers.

For the first output slot, the first group of output ports of the first output slot is connected to the first one of the third optical switches, the second group of output ports of the first output slot is connected to the second one of the third optical switches, . . . , the $N^{th}$ group of output ports of the first output slot is connected to the $N^{th}$ one of the third optical switches.

For the second output slot, the first group of output ports of the second output slot is connected to the second one of the third optical switches, the second group of output ports of the second output slot is connected to the third one of the third optical switches, . . . , the $(N-1)^{th}$ group of output ports of the second output slot is connected to the $N^{th}$ one of the third optical switches, and the $N^{th}$ group of output ports of the second output slot is connected to the first one of the third optical switches; and so on for the third output slot until the $(N-1)^{th}$ output slot.

Finally, for the $N^{th}$ output slot, the first group of output ports of the $N^{th}$ output slot is connected to the $N^{th}$ one of the third optical switches, the second group of output ports of the $N^{th}$ output slot is connected to the first one of the third optical switches, . . . , the $(N-1)^{th}$ group of output ports of the second output slot is connected to the $(N-2)^{th}$ one of the third optical switches, and the $N^{th}$ group of output ports of the second output slot is connected to the $(N-1)^{th}$ one of the third optical switches.

It can be seen from the foregoing technical solutions that the embodiments of the present invention have the following advantages.

In the embodiments of the present invention, an optical switching apparatus includes an input port group, an input allocation matrix, a cross-connect matrix, an output allocation matrix, and an output port group. The input port group includes multiple input slots, and multiple input ports are provided in each input slot. The input allocation matrix includes multiple first optical switches, and an input port of the first optical switch is connected to an input port of the input slot. The cross-connect matrix includes multiple second optical switches, and an output port of the first optical switch is connected to an input port of the second optical switch. The output allocation matrix includes multiple third optical switches, and an input port of the third optical switch is connected to an output port of the second optical switch. The output port group includes multiple output slots, multiple output ports are provided in each output slot, and an output port of the output slot is connected to an output port of the third optical switch. The input port group may transmit optical signals input in each dimension, to the input allocation matrix, and the input allocation matrix transmits the optical signals to the cross-connect matrix. Then the cross-connect matrix transmits the optical signals to the output allocation matrix, and finally the optical signals arrive at the output port group. In this way, grooming of the optical signals in each dimension is implemented. In addition, an optical signal that requires wavelength adding may be input to the optical switching apparatus through an input port of an input slot, and an optical signal obtained after wavelength conversion may also be input to the optical switching apparatus through an input port of an input slot. In addition, an optical signal that requires wavelength dropping may be output through an output port of an output slot, and an optical signal that requires wavelength conversion may also be output through an output port of an output slot. In this way, wavelength adding/dropping and wavelength conversion are implemented for optical signals. In the embodiments of the present invention, optical signals of each wavelength in each dimension can all be input from the input port group, and arrive at any output port of the output port group, and the ports of the optical switching apparatus are shared for dimensional grooming, wavelength adding/dropping, and wavelength conversion of the optical signals. Therefore, waste of port resources may be avoided, and utilization of port resources may be improved. In addition, the input allocation matrix, the cross-connect matrix, and the output allocation matrix are all implemented by using several optical switches, and input ports and output ports are provided in all the optical switches. Therefore, a problem of impossible implementation due to very great process difficulty caused by too many ports in a single optical switch may be resolved, and flexibility is relatively high. The optical signals of each wavelength in each dimension can all be input from the input port group, and arrive at any output port of the output port group. Therefore, during dimensional grooming, wavelength adding/dropping, and wavelength conversion, the optical signals may always arrive at any output port of the output port group, which can reduce a packet loss rate.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons skilled in the art may still derive other drawings from these accompanying drawings.

FIG. 3-a is a schematic structural diagram of a line board according to an embodiment of the present invention;

FIG. 3-b is a schematic structural diagram of a tributary board according to an embodiment of the present invention;

FIG. 6 is a contrast diagram of group interlacing between an input allocation matrix and an input port group according to an embodiment of the present invention;

FIG. 7-a is a schematic diagram of a wavelength dropping implementation manner of an optical switching apparatus according to an embodiment of the present invention;

FIG. 7-b is a schematic diagram of a wavelength adding implementation manner of an optical switching apparatus according to an embodiment of the present invention;

DETAILED DESCRIPTION OF ILLUSTRATIVE EMBODIMENTS

Embodiments of the present invention provide an optical switching apparatus, so as to implement sharing of wavelength adding/dropping and wavelength conversion ports, improve utilization of port resources, and reduce a packet loss rate.

To make the objectives, features, and advantages of the present disclosure clearer and more comprehensible, the following clearly describes the technical solutions in the embodiments of the present invention with reference to the accompanying drawings in the embodiments of the present invention. Apparently, the embodiments described in the following are merely some but not all of the embodiments of the present invention. All other embodiments obtained by persons skilled in the art based on the embodiments of the present invention shall fall within the protection scope of the present disclosure.

In the specification, claims, and accompanying drawings of the present disclosure, the terms "first", "second", and so on are intended to distinguish between similar objects but do not necessarily indicate a specific order or sequence. It should be understood that the terms used in this way are interchangeable in proper circumstances, and are merely distinguishing manners that are used when objects of a same attribute are described in the embodiments that describe the present invention. Moreover, the terms "include", "contain" and any other variants mean to cover the non-exclusive inclusion, so that a process, method, system, product, or device that includes a list of units is not necessarily limited to those units, but may include other units not expressly listed or inherent to such a process, method, system, product, or device.

The following separately provides descriptions in detail.

Figure 1:
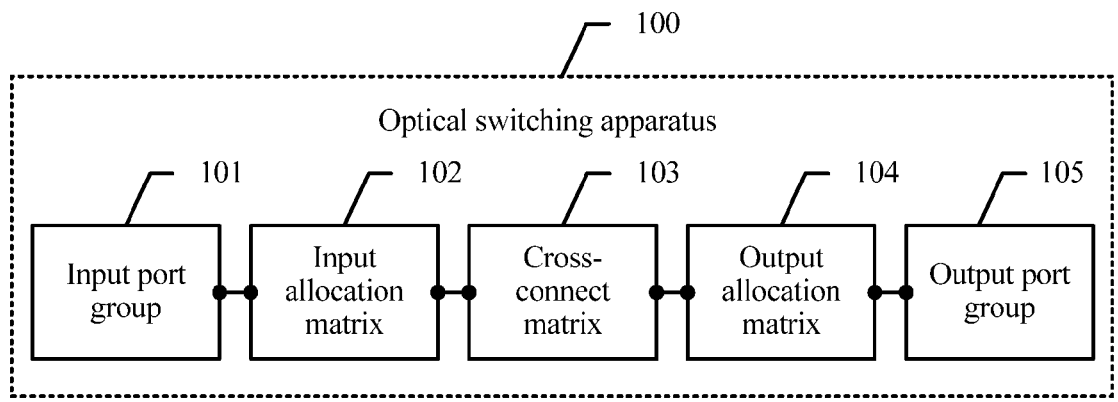
FIG. 1 is a schematic structural diagram of an optical switching apparatus according to an embodiment of the present invention.

Referring to FIG. 1, the optical switching apparatus 100 may include an input port group 101, an input allocation matrix 102, a cross-connect matrix 103, an output allocation matrix 104, and an output port group 105.

The input port group 101 includes multiple (i.e. a plurality of) input slots, and multiple (i.e. a plurality of) input ports are provided in each input slot of the multiple input slots. The input slot is configured to input optical signals in each dimension, or configured to input an optical signal that requires wavelength adding, or configured to input an optical signal obtained after wavelength conversion.

The input allocation matrix 102 is connected to the input port group 101 in fiber cross-connection mode. The input allocation matrix 102 includes multiple (i.e. a plurality of) first optical switches. An input port of the first optical switch is connected to an input port of the plurality of input slots.

The cross-connect matrix 103 includes multiple (i.e. a plurality of) second optical switches. The second optical switch corresponds to one or more wavelengths, and an input port of the second optical switch is connected to an output port of the plurality of first optical switches.

The output allocation matrix 104 includes multiple third optical switches, and an input port of the third optical switch is connected to an output port of the second optical switch.

The output port group 105 is connected to the output allocation matrix 104 in fiber cross-connection mode. The output port group 105 includes multiple (i.e. a plurality of) output slots, and multiple (i.e. a plurality of) output ports are provided in each output slot of the plurality of output slots. An output port of the plurality of output slots is connected to an output port of the plurality of third optical switches. The output slot is configured to output optical signals in each dimension, or configured to output an optical signal that requires wavelength dropping, or configured to output an optical signal that requires wavelength conversion.

In this embodiment of the present invention, the input port group 101 is connected to an external optical signal input device (not shown in FIG. 1), and the input port group 101 receives an optical signal input by the external optical signal input device. The external optical signal input device may be a previous node device in an optical transmission network in which the optical switching apparatus 100 is located. The previous node device transmits optical signals to the optical switching apparatus 100 provided by this embodiment of the present invention, and the input port group 101 of the optical switching apparatus 100 receives optical signals in each dimension from the previous node device. In addition, the external optical signal input device may also be a wavelength convergence conversion board connected to the optical switching apparatus. When the wavelength convergence conversion board performs wavelength adding/dropping and wavelength conversion on optical signals, the wavelength convergence conversion board inputs an optical signal that requires wavelength adding to the optical switching apparatus. After performing wavelength conversion on an optical signal, the wavelength convergence conversion board may input the optical signal to the optical switching apparatus 100. The wavelength convergence conversion board is connected to the optical switching apparatus 100 provided by this embodiment of the present invention. The wavelength convergence conversion board is configured to implement wavelength adding/dropping and wavelength conversion functions. When a local optical signal requires wavelength adding, the local optical signal may be added to the optical switching apparatus through the input port group 101 of the optical switching apparatus 100 after passing through the wavelength convergence conversion board. The optical switching apparatus 100 outputs an optical signal that requires wavelength dropping from the output port group 105 to the optical switching apparatus, and the wavelength convergence conversion board may drop the dropped optical signal locally. In addition, for the optical signal dropped from the optical switching apparatus 100, the wavelength convergence conversion board may directly perform wavelength conversion, and then an optical signal obtained after the wavelength conversion is directly added to the optical switching apparatus 100 through the input port group 101 of the optical switching apparatus 100.

Figure 2:
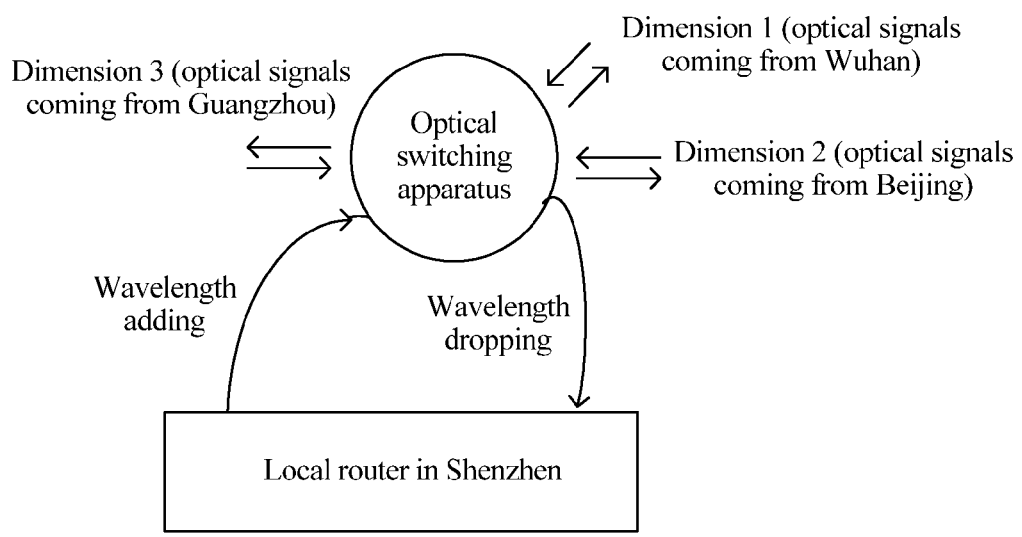
FIG. 2 is a schematic diagram of an application scenario of an optical switching apparatus according to an embodiment of the present invention.

FIG. 2 is a schematic diagram of an application scenario of an optical switching apparatus according to an embodiment of the present invention. Assuming that an optical switching apparatus in Shenzhen is configured to groom optical signals of Guangzhou, Wuhan, Beijing, and Shenzhen, a total of four areas. Optical signals coming from Wuhan and destined for Wuhan are referred to as a dimension 1, optical signals coming from Beijing and destined for Beijing are referred to as a dimension 2, and signals coming from Guangzhou and destined for Guangzhou are referred to as a dimension 3. There may be optical signals of multiple wavelengths in each dimension, and wavelengths of optical signals in different dimensions may also be different. Local optical signals coming from Shenzhen may be directly added from a local router in Shenzhen to the optical switching apparatus through an input port group of the optical switching apparatus, so that wavelength adding is implemented for the optical signals. Optical signals destined for Shenzhen are dropped to the local router in Shenzhen from an output port group of the optical switching apparatus, so that wavelength dropping is implemented for the optical signals. The optical switching apparatus may perform dimensional grooming on optical signals in each dimension. The optical switching apparatus may further input the optical signals to a wavelength convergence conversion board, and the wavelength convergence conversion board performs wavelength adding/dropping and wavelength conversion on the optical signals. The optical signals of each wavelength in each dimension in the optical switching apparatus 100 can be input from the input port group 101, and arrive at an output port of the output port group 105. The ports of the optical switching apparatus 100 are shared for dimensional grooming, wavelength adding/dropping, and wavelength conversion of the optical signals. Therefore, waste of port resources may be avoided, and utilization of port resources may be improved. Using the input port group 101 as an example, herein the shared ports of the optical switching apparatus 100 refer to multiple input ports of the input port group 101 that are shared for input optical signals in multiple dimensions on which dimensional grooming is performed, optical signals that require wavelength adding, and optical signals after wavelength conversion, without being limited to dedicated ports allocated to each wavelength plane. In this way, utilization of port resources of the optical switching apparatus in this embodiment of the present invention is improved.

It should be noted that there are optical signals of multiple wavelengths in each dimension. If an optical signal of a first wavelength (e.g., referred to as wavelength 1) in the dimension 1 needs to be groomed to the dimension 3, and an optical signal of the wavelength 1 in the dimension 2 also needs to be groomed to the dimension 3, the optical signals whose wavelengths are the wavelength 1 in the dimension 1 and the dimension 2 may collide with each other. If the two optical signals of the wavelength 1 that carry signals are directly groomed to the dimension 3, the two optical signals are combined, and the optical signal in the dimension 3 disappears. Therefore, first, the optical signal of the wavelength 1 in the dimension 2 needs to be groomed out of the optical switching apparatus, and then wavelength conversion is performed to convert the optical signal to the wavelength 2. Following this, the optical signal is added to the optical switching apparatus, and then groomed to the dimension 3. Therefore, wavelength conversion needs to be performed on the optical signal when dimensional grooming is performed on the optical signal.

It should be noted that in an embodiment of the present invention, multiple slots are provided in the optical switching apparatus 100, and the multiple slots are configured to connect to a previous node device in an optical transmission network in which the optical switching apparatus is located. The multiple slots may also be configured to connect to a wavelength convergence conversion board. Because the slots provided in the optical switching apparatus 100 are used for the input port group 101 and the output port group 105, which are different, the slots are respectively defined as input slots and output slots, where the input slots belong to the input port group 101, and the output slots belong to the output port group 105. In addition, the ports in this embodiment of the present invention refer to optical transmission ports of optical switches, and for ease of description, the ports are respectively defined as input ports and output ports according to different functions for which the ports are used.

In some embodiments of the present invention, the input port group 101 includes multiple input slots, where multiple input ports are provided in each input slot. Generally, a quantity of input ports provided in each input slot is greater than or equal to a total quantity of wavelengths of various optical signals. For example, if an external optical signal input device inputs optical signals of a total of 20 different wavelengths to the optical switching apparatus, for the quantity of input ports provided in each input slot, 20 input ports or more than 20 input ports are generally needed.

However, to avoid waste of port resources, the quantity of input ports provided in each input slot is not limited, provided that it can be ensured that all optical signals of different wavelengths can be input to the input ports.

In some embodiments of the present invention, the input port group 101 includes multiple input slots, where optical signals input from some input slots are used for dimensional grooming, and where optical signals input from some other input slots are optical signals that require wavelength adding and optical signals after wavelength conversion. Input slots configured to input optical signals that require dimensional grooming, and input slots configured to input optical signals that require wavelength adding and optical signals after wavelength conversion, may be allocated according to a proportion of signals that require wavelength adding/dropping and wavelength conversion to all optical signals in all dimensions. The proportion of signals that require wavelength adding/dropping and wavelength conversion to all optical signals refers to a proportion of optical signals that require wavelength adding, optical signals that require wavelength dropping, and optical signals that require wavelength conversion to all optical signals in the optical switching apparatus. In some embodiments of the present invention, all input slots in the input port group 101 may be classified into two types: a first type of input slot and a second type of input slot, where the first type of input slot is configured to input an optical signal that requires dimensional grooming, and the second type of input slot is configured to input an optical signal that requires wavelength adding or an optical signal obtained after wavelength conversion. For the first type of input slot, a line board may be inserted to input an optical signal that requires dimensional grooming. For the second type of input slot, a tributary board may be inserted to input an optical signal that requires wavelength adding or an optical signal obtained after wavelength conversion. Wavelength adding/dropping and wavelength conversion of optical signals are performed in a wavelength convergence conversion board. Wavelength adding/dropping and wavelength conversion of optical signals may also be implemented in a dedicated optical signal processing device.

In some embodiments of the present invention, the second type of input slot may refer to two types of input slots. The second type of input slot includes a wavelength adding input slot and a conversion input slot, where the wavelength adding input slot is configured to input an optical signal that requires wavelength adding, and the conversion input slot is configured to input an optical signal obtained after wavelength conversion. That is, an input slot may be configured to transmit a specific type of optical signal. This may be implemented by the second type of input slot, or may be implemented by the wavelength adding input slot and the conversion input slot separately, which is for description purposes herein.

For example, for optical signals input from an input slot, there is a line board corresponding to optical signals in each dimension. One line board includes a multiplexer (MUX) and a demultiplexer (DEMUX). FIG. 3-a shows a schematic structural diagram of a line board according to an embodiment of the present invention. It should be noted that no repeater such as an amplifier is drawn on the line board shown in the figure. In addition, for an input slot configured to input optical signals in each dimension, or input an optical signal that requires wavelength adding, or input an optical signal obtained after wavelength conversion, there is a tributary board corresponding to each dimension. The tributary board can connect a port of an optical switch to an external local router. FIG. 3-b shows a schematic structural diagram of a tributary board according to an embodiment of the present invention, where no repeater such as an amplifier is drawn on the tributary board shown in the figure, and all optical signals that require wavelength adding/dropping or wavelength conversion need to be output or input through the tributary board.

For example, for optical signals input from an input slot, if optical signals in each dimension all include optical signals of 40 wavelengths, a line board requires 40 MUX ports and 40 DEMUX ports. Therefore, slot positions in each input slot in the input port group are 80 ports, and the line board, when inserted, can exactly match the input slots. If optical signals in each dimension all include optical signals of 80 wavelengths, a line board requires 80 MUX ports and 80 DEMUX ports. To adapt to slot positions, a tributary board is generally made in such a manner that it has a same port quantity as the line board. Each line board occupies slot positions of one input slot, and each tributary board occupies slot positions of one input slot.

In an embodiment of the present invention, the input allocation matrix 102 includes multiple first optical switches. An input port of a first optical switch of the multiple first optical switches is connected to an input port of an input slot of the plurality of input slots. The input allocation matrix 102 is connected to the input port group 101 in fiber cross-connection mode. The input allocation matrix 102 includes multiple optical switches. In order that optical switches included in the input allocation matrix 102, optical switches included in the cross-connect matrix 103, and optical switches included in the output allocation matrix 104 can be distinguished from each other, the optical switches are defined by naming for distinguishing. The optical switches included in the input allocation matrix 102 are defined as "first optical switches", the optical switches included in the cross-connect matrix 103 are defined as "second optical switches", and the optical switches included in the output allocation matrix 104 are defined as "third optical switches".

An optical switch provided by an embodiment of the present invention generally has input ports and output ports. An optical signal input from any input port of the optical switch may be output from any output port of the optical switch, and several optical switches are integrated in one device or module and referred to as an optical switch array. Optical signals of different wavelengths are mixed together and input from an input port of the optical switch. An optical switch may select several wavelengths to output from one output port of the optical switch, and several other wavelengths to output from other output ports of the optical switch.

It should be noted that in this embodiment of the present invention, the input allocation matrix 102 is connected to the input port group 101 in fiber cross-connection mode. This means that each input slot in the input port group 101 is connected to each first optical switch in the input allocation matrix 102 by using a fiber. For example, if the input port group 101 includes an input slot 1, an input slot 2, and an input slot 3, then the input slot 1 is connected to each first optical switch in the input allocation matrix 102 by using a fiber, the input slot 2 is connected to each first optical switch in the input allocation matrix 102 by using a fiber, and the input slot 3 is connected to each first optical switch in the input allocation matrix 102 by using a fiber.

In some embodiments of the present invention, the input allocation matrix 102 being connected to the input port group 101 in fiber cross-connection mode may include the following. The input ports of each input slot of the multiple input slots are grouped into multiple groups, and each group of input ports is connected to each first optical switch of the input allocation matrix. The multiple groups of input ports are respectively connected to each first optical switch of the input allocation matrix in interlacing mode. Generally, all input ports of each input slot may be approximately grouped into multiple groups evenly, and after the grouping, each group of input ports of a given input slot is connected to a first optical switch of the input allocation matrix 102, where each input slot included in the input port group 101 is connected to each first optical switch of the input allocation matrix 102 according to the foregoing connection mode between the input slot and each first optical switch. The foregoing connection mode between the input slot and each first optical switch may ensure that optical signals of each wavelength input from each input slot can be transmitted to each input port of each first optical switch of the input allocation matrix. Each group of input ports is connected to each first optical switch of the input allocation matrix in interlacing mode. The interlacing may be interlacing of each group of input ports when each group of input ports is connected to each first optical switch of the input allocation matrix. For details, refer to descriptions of subsequent embodiments in the embodiments of the present invention and the accompanying drawings.

In addition, the output port group 105 being connected to the output allocation matrix 104 in fiber cross-connection mode may include the following. The output ports of each output slot of the multiple output slots are grouped into multiple groups, and each group of output ports of a given output slot is connected to a third optical switch of the output allocation matrix. The multiple groups of output ports are respectively connected to the third optical switch of the output allocation matrix 104 in interlacing mode. The fiber cross-connection mode between the output port group 105 and the output allocation matrix 104 is similar to the foregoing fiber cross-connection mode between the input port group 101 and the input allocation matrix 102.

In an embodiment of the present invention, the input allocation matrix 102 is connected to the input port group 101, and the input allocation matrix 102 is further connected to the cross-connect matrix 103. The cross-connect matrix 103 includes multiple (i.e. a plurality of) second optical switches. The cross-connect matrix 103 includes multiple (i.e. a plurality of) optical switches. The optical switches included in the cross-connect matrix 103 are defined as second optical switches so that they can be distinguished from the optical switches included in the input allocation matrix 102, where each second optical switch corresponds to one or more wavelengths. An input port of a second optical switch is connected to an output port of a first optical switch of the input allocation matrix 102. Assuming that there are 100 wavelengths $\lambda_1, \lambda_2, \ldots, \lambda_{100}$ in total and the cross-connect matrix 103 includes 20 second optical switches, then the 100 wavelengths are evenly grouped into 20 groups, and each group includes five wavelengths. Because the cross-connect matrix 103 includes 20 second optical switches, each second optical switch corresponds to five wavelengths, which are the following: wavelengths $\lambda_1$, $\lambda_2, \ldots, \lambda_5$ corresponding to a first one of the second optical switches; wavelengths $\lambda_1, \lambda_7, \ldots, \lambda_{10}$ corresponding to a second one of the second optical switches; wavelengths $\lambda_{11}$, $\lambda_{12}, \ldots, \lambda_{15}$ corresponding to a third one of the second optical switches; and so on, until wavelengths $\lambda_{96}$, $\lambda_{97}, \ldots, \lambda_{100}$ correspond to a twentieth one of the second optical switches. In addition, which five wavelengths correspond to each second optical switch may be flexibly set according to a specific application scenario, and is not limited herein.

In some embodiments of the present invention, when the second optical switch corresponds to M wavelengths, M fibers are used to connect ports of the second optical switch and ports of the first optical switch, where M is a non-zero natural number. For example, each second optical switch corresponds to five wavelengths, and five fibers are used to connect ports of each second optical switch and ports of each first optical switch.

In an embodiment of the present invention, the cross-connect matrix 103 is connected to the input allocation matrix 102, and the cross-connect matrix 103 is connected to the output allocation matrix 104. The output allocation matrix 104 includes multiple (i.e. a plurality of) third optical switches. The optical switches included in the output allocation matrix are defined as third optical switches so that they can be distinguished from the optical switches included in the input allocation matrix 102 and the optical switches included in the cross-connect matrix 103. An input port of the second optical switch included in the cross-connect matrix 103 is connected to an output port of the first optical switch, and an output port of the second optical switch included in the cross-connect matrix 103 is connected to an input port of the third optical switch. The connection mode between the cross-connect matrix 103 and the output allocation matrix 104 is similar to the foregoing connection mode between the cross-connect matrix 103 and the input allocation matrix 102, and is not further described herein.

In an embodiment of the present invention, the output port group 105 is connected to the output allocation matrix 104 in fiber cross-connection mode in the optical switching apparatus 100. The output port group 105 includes multiple (i.e. a plurality of) output slots, and multiple (i.e. a plurality of) output ports are provided in each output slot of the plurality of output slots. An output port of a given output slot is connected to an output port of the third optical switch, and the output slot is configured to output optical signals in each dimension, or configured to output an optical signal that requires wavelength dropping, or configured to output an optical signal that requires wavelength conversion. The output port group 105 constituted by the output slots is configured to connect to a next node device in an optical transmission network in which the optical switching apparatus 100 is located, or connect to a wavelength convergence conversion board. Generally, a quantity of output ports provided in each output slot is greater than or equal to a total quantity of wavelengths of various optical signals. For example, if an external optical signal input device inputs optical signals of a total of 20 different wavelengths to the optical switching apparatus, for the quantity of output ports provided in each output slot, 20 output ports or more than 20 output ports are generally needed. However, to avoid waste of port resources, the quantity of output ports provided in each output slot is not limited provided that it can be ensured that all optical signals of different wavelengths can be output to the output ports.

In some embodiments of the present invention, the output port group 105 includes multiple (i.e. a plurality of) output slots, where some output slots are configured to output optical signals that require dimensional grooming, and some other output slots are configured to output optical signals that require wavelength dropping or optical signals that require wavelength conversion. Output slots configured to output optical signals that require dimensional grooming and output slots configured to output optical signals that require wavelength adding/dropping and wavelength conversion may be allocated according to a proportion of signals that require wavelength adding/dropping and wavelength conversion to all optical signals in all dimensions. In some embodiments of the present invention, all output slots in the output port group 105 may be classified into two types: a first type of output slot and a second type of output slot, where the first type of output slot is configured to output an optical signal that requires dimensional grooming, and the second type of output slot is configured to output an optical signal that requires wavelength dropping or an optical signal that requires wavelength conversion. For the first type of output slot, a line board may be inserted to output an optical signal that requires dimensional grooming. For the second type of output slot, a tributary board may be inserted to output an optical signal that requires wavelength dropping or an optical signal that requires wavelength conversion. For the descriptions of the line board and tributary board inserted in the output slots, refer to the foregoing descriptions of FIG. 3-*a* and FIG. 3-*b*.

In some embodiments of the present invention, the second type of output slot may refer to two types of output slots. The second type of output slot includes a wavelength dropping output slot and a conversion output slot, where the wavelength dropping input slot is configured to output an optical signal that requires wavelength dropping, and the conversion output slot is configured to output an optical signal that requires wavelength conversion. That is, an output slot may be configured to transmit a specific type of optical signal. This may be implemented by the second type of output slot, or may be implemented by the wavelength dropping output slot and the conversion output slot separately, which is for description purposes herein.

In an embodiment of the present invention, each input port and output port in the optical switching apparatus 100 may be shared for wavelength adding/dropping, wavelength conversion, and dimensional grooming, and optical signals of each wavelength in each dimension that are input through an input port of an input port group can all arrive at any output port of any output port group. This may ensure highest utilization of ports in an input slot and an output slot. In an embodiment of the present invention, three-stage optical switches are used, and are respectively defined as a first optical switch, a second optical switch, and a third optical switch. A combination of multiple first optical switches is defined as an input allocation matrix 102, a combination of multiple third optical switches is defined as an output allocation matrix 104, and a combination of multiple second optical switches is defined as a cross-connect matrix 103. All ports of a line board and a tributary board on both sides are rearranged according to ports of the input allocation matrix 102 and the output allocation matrix 104. If an optical signal of a particular wavelength is groomed to another dimension at a previous moment, and wavelength dropping (or wavelength adding) or wavelength conversion is performed at a next moment, this switching process is mainly completed by using the input allocation matrix 102 and the output allocation matrix 104. The cross-connect matrix 103 is at an intermediate stage, and configured to groom optical signals between dimensions. For example, an optical signal of a wavelength 1 in a dimension 1 is groomed to a wavelength 1 in a dimension 2, and the grooming is completed by the intermediate cross-connect matrix 103. In addition, in a case in which some allocation matrices are fully loaded for wavelength adding/dropping, the cross-connect matrix 103 may be used for offloading.

It should be noted that in some embodiments of the present invention, the input allocation matrix 102 and the output allocation matrix 104 may be implemented by using an only allocation matrix. That is, in this embodiment of the present invention, the optical switching apparatus 100 may include an input port group 101, an allocation matrix, a cross-connect matrix 103, and an output port group 105. The allocation matrix may implement functions of both the input allocation matrix 102 and the output allocation matrix 104. The input port group 101 is connected to the allocation matrix in fiber cross-connection mode. The allocation matrix is connected to the cross-connect matrix 103, and the allocation matrix is connected to the output port group 105 in fiber cross-connection mode. From a perspective of an optical switch combination, the input allocation matrix 102 and the output allocation matrix 104 may be implemented by using one allocation matrix. However, from a perspective of an optical switch, a first optical switch in the input allocation matrix 102 and a third optical switch in the output allocation matrix 104 are a same optical switch. An input port of the first optical switch and an output port of the third optical switch are input ports of the same optical switch, and an output port of the first optical switch and an input port of the third optical switch are output ports of the same optical switch.

Figure 4:
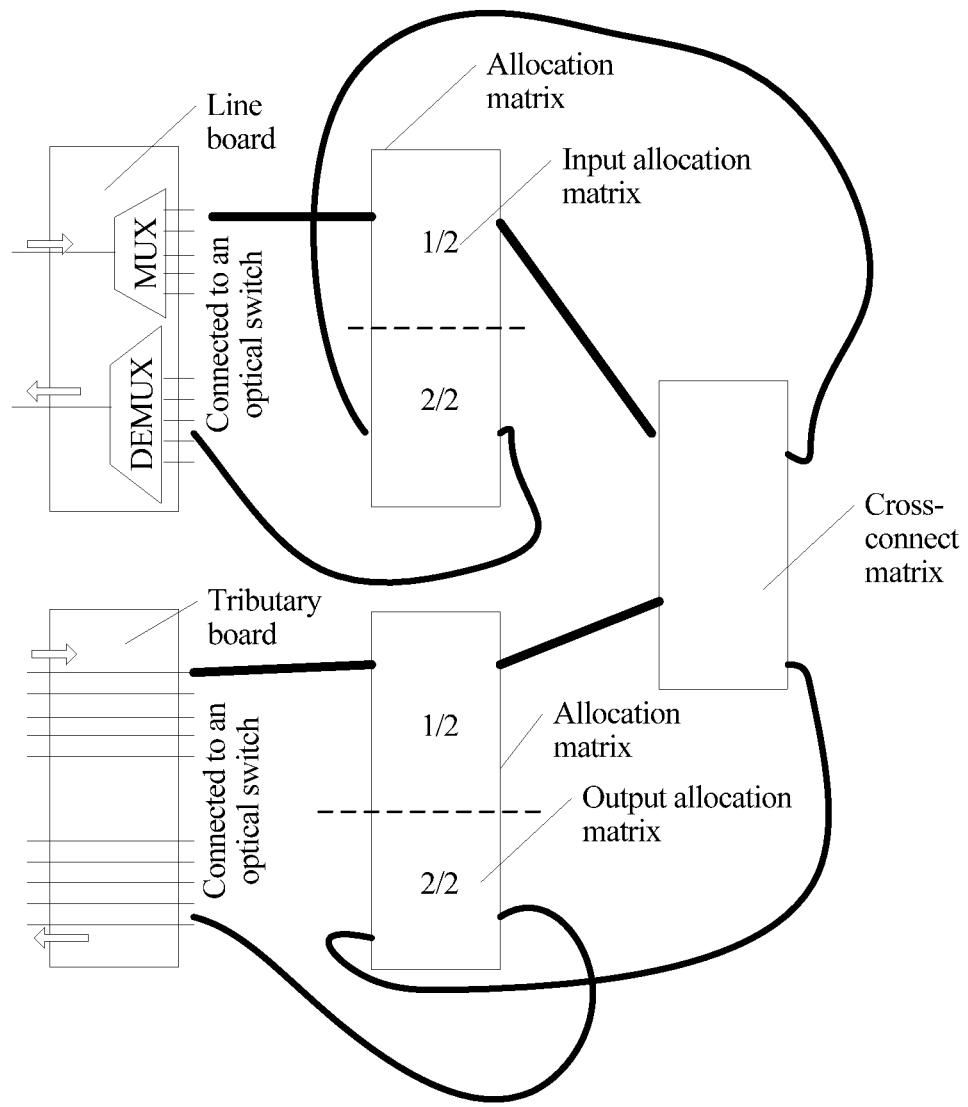
FIG. 4 is a schematic diagram of a connection mode of an input allocation matrix, an output allocation matrix, and a cross-connect matrix according to an embodiment of the present invention.

FIG. 4 is a schematic diagram of a connection mode of an input allocation matrix 102, an output allocation matrix 104, and a cross-connect matrix 103 according to an embodiment of the present invention, where the input allocation matrix 102 and the output allocation matrix 104 are a same allocation matrix. An allocation matrix including two optical switches is used as an example for description. For ease of description of a connection mode between an allocation matrix and a cross-connect matrix, in FIG. 4, an allocation matrix that is split into an input allocation matrix and an output allocation matrix is still used for description, where "1/2" is used to represent an input allocation matrix, "2/2" is used to represent an output allocation matrix, and a combination of "1/2" and "2/2" is used to represent an allocation matrix. A line board and a tributary board are inserted in an input port group 101 and an output port group 105, the input allocation matrix is connected to the line board and the cross-connect matrix, the cross-connect matrix 103 is connected to the output allocation matrix, and the output allocation matrix is connected to the tributary board.

In some embodiments of the present invention, every T second optical switches in multiple second optical switches of the cross-connect matrix are combined into one optical switch, each first optical switch in multiple first optical switches of the input allocation matrix is split into T optical switches, and each split optical switch is connected to each combined optical switch, where T is a non-zero natural number. That is, in an embodiment of the present invention, to reduce scales of the optical switches in the input allocation matrix, the second optical switches in the cross-connect matrix may be combined, and the first optical switches in the input allocation matrix are split. The combining means that functions of multiple small optical switches are implemented by one large optical switch, and the splitting means that functions of one large optical switch are implemented by several small optical switches. Assuming that T is 2, every two second optical switches in the cross-connect matrix may be combined into one optical switch, and every first optical switch in the input allocation matrix is split into two optical switches. Then each split optical switch is connected to each combined optical switch. Splitting the first optical switches in the input allocation matrix may reduce the scales of the optical switches in the input allocation matrix, and may further reduce costs of using large-scale optical switches.

As can be learned from the foregoing descriptions of the embodiments of the present invention, an optical switching apparatus boo includes an input port group 101, an input allocation matrix 102, a cross-connect matrix 103, an output allocation matrix 104, and an output port group 105. The input port group 101 includes multiple input slots, and multiple input ports are provided in each input slot. The input allocation matrix 102 includes multiple first optical switches, and an input port of a first optical switch of the multiple first optical switches is connected to an input port of an input slot of the multiple input slots. The cross-connect matrix 103 includes multiple second optical switches, and an output port of a first optical switch of the multiple first optical switches is connected to an input port of a second optical switch of the multiple second optical switches. The output allocation matrix 104 includes multiple third optical switches, and an input port of a third optical switch of the multiple third optical switches is connected to an output port of a second optical switch of the multiple second optical switches. The output port group 105 includes multiple output slots, and multiple output ports are provided in each output slot. An output port of the output slot is connected to an output port of the third optical switch. The input port group 101 may transmit optical signals input in each dimension, to the input allocation matrix 102, and the input allocation matrix 102 transmits the optical signals to the cross-connect matrix 103. Then the cross-connect matrix 103 transmits the optical signals to the output allocation matrix 104, and finally the optical signals arrive at the output port group 105. In this way, grooming of the optical signals in each dimension is implemented. In addition, an optical signal that requires wavelength adding may be input to the optical switching apparatus 100 through an input port of an input slot, and an optical signal obtained after wavelength conversion may also be input to the optical switching apparatus 100 through an input port of an input slot. In addition, an optical signal that requires wavelength dropping may be output through an output port of an output slot, and an optical signal that requires wavelength conversion may also be output through an output port of an output slot. In this way, wavelength adding/dropping and wavelength conversion are implemented for optical signals. In this embodiment of the present invention, optical signals of each wavelength in each dimension can all be input from the input port group, and arrive at any output port of the output port group, and the ports of the optical switching apparatus are shared for dimensional grooming, wavelength adding/dropping, and wavelength conversion of the optical signals. Therefore, waste of port resources may be avoided, and utilization of port resources may be improved. In addition, the input allocation matrix 102, the cross-connect matrix 103, and the output allocation matrix 104 are all implemented by using several optical switches, and input ports and output ports are provided in all the optical switches. Therefore, a problem of onerous implementation due to difficulty caused by too many ports in a single optical switch may be resolved, and flexibility is relatively high. The optical signals of each wavelength in each dimension can all be input from the input port group, and arrive at any output port of the output port group. Therefore, during dimensional grooming, wavelength adding/dropping, and wavelength conversion, the optical signals may always arrive at any output port of the output port group, which can reduce a packet loss rate. In an optical switching system node, wavelength adding/dropping ports of the optical switching apparatus may be shared for optical signals in different dimensions.

To help better understand and implement the foregoing solutions of the embodiments of the present invention, the following uses a corresponding application scenario as an example for detailed description.

Figure 5:
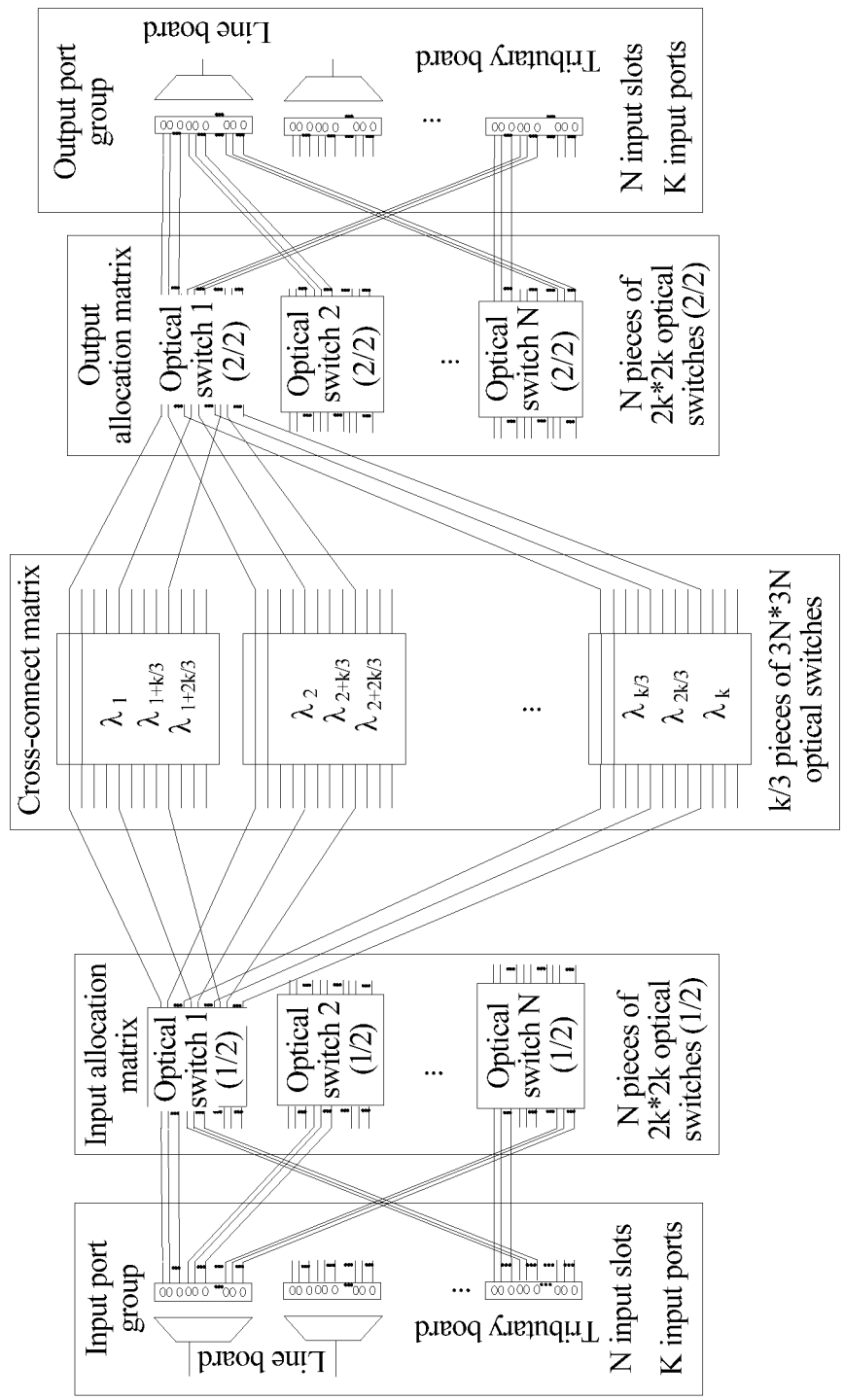
FIG. 5 is a schematic structural diagram of another optical switching apparatus according to an embodiment of the present invention.

FIG. 5 is a schematic structural diagram of another optical switching apparatus according to an embodiment of the present invention, where the following are provided.

An input port group includes N input slots, and K input ports are provided in each input slot, where 2N/3 input slots are configured to input optical signals in each dimension, and N/3 input slots are configured to input an optical signal that requires wavelength adding or an optical signal obtained after wavelength conversion, where the N and K are both non-zero natural numbers.

An input allocation matrix includes N first optical switches. An input port quantity of each first optical switch is 2K, an output port quantity of each first optical switch is 2K, and the 2K input ports of each input slot are connected to input ports of the N first optical switches.

A cross-connect matrix includes K/3 second optical switches. An input port quantity of each second optical switch is 3N, an output port quantity of each second optical switch is 3N, each second optical switch corresponds to three wavelengths, and the 2K output ports of each first optical switch are connected to the K/3 second optical switches.

An output allocation matrix includes N third optical switches. An input port quantity of each third optical switch is 2K, an output port quantity of each third optical switch is 2K, and the 2K input ports of each third optical switch are connected to the K/3 second optical switches.

An output port group includes N output slots, and K output ports are provided in each output slot. The K output ports of each output slot are connected to the N third optical switches, 2N/3 output slots are configured to output optical signals in each dimension, and N/3 output slots are configured to output an optical signal that requires wavelength dropping or an optical signal that requires wavelength conversion.

For the N input slots included in the input port group, each input slot includes K slot positions, and each slot position corresponds to one input port. Therefore, there are K input ports in each input slot. When a maximum proportion of wavelength adding/dropping and wavelength conversion is 50%, a quantity of line boards inserted in the input slots is less than ⅔ of a slot position quantity. In this embodiment of the present invention, all wavelength adding/dropping and wavelength conversion ports can be used for optical signals of all wavelengths in all dimensions. In FIG. 5, for example, line boards are inserted in ⅔ slot positions, and tributary boards are inserted in the remaining slot positions.

In some embodiments of the present invention, the input allocation matrix is connected to the input port group in fiber cross-connection mode. The N input slots included in the input port group are a first input slot, a second input slot, and so on, until an $N^{th}$ input slot. The K input ports in each input slot are grouped into N groups, and the N groups of input ports in each input slot are respectively a first group of input ports, a second group of input ports, and so on, until an $N^{th}$ group of input ports. Each group of input ports includes K/N input ports. The N first optical switches of the input allocation matrix are respectively a first one of the first optical switches, a second one of the first optical switches, and so on, until an $N^{th}$ one of the first optical switches.

For the first input slot, the first group of input ports of the first input slot is connected to the first one of the first optical switches, the second group of input ports of the first input slot is connected to the second one of the first optical switches, and so on, until the $N^{th}$ group of input ports of the first input slot is connected to the $N^{th}$ one of the first optical switches.

For the second input slot, the first group of input ports of the second input slot is connected to the second one of the first optical switches, the second group of input ports of the second input slot is connected to the third one of the first optical switches, and so on, until the $(N-1)^{th}$ group of input ports of the second input slot is connected to the $N^{th}$ one of the first optical switches, and the $N^{th}$ group of input ports of the second input slot is connected to the first one of the first optical switches.

For the $N^{th}$ input slot, the first group of input ports of the $N^{th}$ input slot is connected to the $N^{th}$ one of the first optical switches, the second group of input ports of the $N^{th}$ input slot is connected to the first one of the first optical switches, and so on, until the $(N-1)^{th}$ group of input ports of the $N^{th}$ input slot is connected to the $(N-2)^{th}$ one of the first optical switches, and the $N^{th}$ group of input ports of the $N^{th}$ input slot is connected to the $(N-1)^{th}$ one of the first optical switches.

Connecting the input allocation matrix and the input port group in the foregoing group interlacing mode may ensure that wavelengths input by each first optical switch of the input allocation matrix are different. For a brief description of group interlacing between the input allocation matrix and the input port group, refer to a contrast diagram of group interlacing between an input allocation matrix and an input port group as shown in FIG. 6.

In FIG. 6, a horizontal axis represents the N first optical switches included in the input allocation matrix 102. On the horizontal axis, "1" represents the first one of the first optical switches, "2" represents the second one of the first optical switches, and so on, until "N" represents the $N^{th}$ one of the first optical switches. In FIG. 6, a vertical axis represents the N input slots included in the input port group 101. On the vertical axis, "1" represents the first input slot, "2" represents the second input slot, and so on, until "N" represents the $N^{th}$ input slot. Content on the right of the vertical axis in FIG. 6 represents the N groups of input ports in each input slot. For example, for a row in which the first input slot "1" on the vertical axis is located, "1" is used to represent the first group of input ports, "2" is used to represent the second group of input ports, and so on, until "N" is used to represent the $N^{th}$ group of input ports. Meanings of content in rows on the right of the second input slot "2" and the like on the vertical axis are similar. For example, for a row in which the third input slot "3" on the vertical axis is located, "N-1" is used to represent the $(N-1)^{th}$ group of input ports, "N" is used to represent the $N^{th}$ group of input ports, and so on, until "N-2" is used to represent the $(N-2)^{th}$ group of input ports.

It should be noted that in the optical switching apparatus shown in FIG. 6, the input allocation matrix includes a total of N optical switches (that is, the first optical switches), which are the optical switch 1, optical switch 2, and so on, until optical switch N. The output allocation matrix includes a total of N optical switches (that is, the third optical switches), which are respectively the optical switch 1, optical switch 2, and so on, until optical switch N. The cross-connect matrix includes a total of K/3 optical switches (that is, the second optical switches), which are the optical switch 1, optical switch 2, and so on, until optical switch K/3. Each optical switch corresponds to three wavelengths, where wavelengths corresponding to the optical switch 1 are $\lambda_1$, $\lambda_{1+K/3}$, and $\lambda_{1+2K/3}$; wavelengths corresponding to the optical switch 2 are $\lambda_2$, $\lambda_{2+K/3}$, and $\lambda_{2+2K/3}$; and so on, until wavelengths corresponding to the optical switch K/3 are $\lambda_{K/3}$, $\lambda_{2K/3}$, and $\lambda_k$.

In FIG. 6, the input allocation matrix and the output allocation matrix are implemented by using a same group of optical switches, and include a total of N optical switches. A scale of each optical switch is 2k*2k. One half of ports in each optical switch in the N optical switches belong to the input allocation matrix, and one half of ports in each optical switch in the N optical switches belong to the output allocation matrix.

In some embodiments of the present invention, the output port group being connected to the output allocation matrix in fiber cross-connection mode may include the following.

The output port group includes N output slots. The N output slots are respectively a first output slot, a second output slot, and so on, until an $N^{th}$ output slot. K output ports in each output slot are grouped into N groups, where the N groups of output ports in each output slot are respectively a first group of output ports, a second group of output ports, and so on, until an $N^{th}$ group of output ports. Each group of output ports includes K/N output ports. The N third optical switches of the output allocation matrix are respectively a first one of the third optical switches, a second one of the third optical switches, and so on, until an $N^{th}$ one of the third optical switches, where the N and K are both non-zero natural numbers.

For the first output slot, the first group of output ports of the first output slot is connected to the first one of the third optical switches, the second group of output ports of the first output slot is connected to the second one of the third optical switches, and so on, until the $N^{th}$ group of output ports of the first output slot is connected to the $N^{th}$ one of the third optical switches.

For the second output slot, the first group of output ports of the second output slot is connected to the second one of the third optical switches, the second group of output ports of the second output slot is connected to the third one of the third optical switches, and so on, until the $(N-1)^{th}$ group of output ports of the second output slot is connected to the $N^{th}$ one of the third optical switches, and the $N^{th}$ group of output ports of the second output slot is connected to the first one of the third optical switches; and For the $N^{th}$ output slot, the first group of output ports of the $N^{th}$ output slot is connected to the $N^{th}$ one of the third optical switches, the second group of output ports of the $N^{th}$ output slot is connected to the first one of the third optical switches, and so on, until the $(N-1)^{th}$ group of output ports of the second output slot is connected to the $(N-2)^{th}$ one of the third optical switches, and the $N^{th}$ group of output ports of the second output slot is connected to the $(N-1)^{th}$ one of the third optical switches.

It should be noted that connecting the output port group and the output allocation matrix in fiber cross-connection mode is similar to connecting the input allocation matrix and the input port group in fiber cross-connection mode described above. For descriptions of examples, refer to the embodiment shown in FIG. 6. A difference lies in that the input ports and input allocation matrix are used as examples in FIG. 6, and however, the output ports and output allocation matrix may be used as examples herein. Therefore, details are not described again herein.

In an embodiment of the present invention, a connection mode between the input allocation matrix and the cross-connect matrix is as follows. Each optical switch of the input allocation matrix includes K output ports, which are respectively connected to K/3 optical switches of the cross-connect matrix. Three ports in each optical switch of the input allocation matrix are connected to each optical switch of the cross-connect matrix. The connection mode between the output allocation matrix and the cross-connect matrix is the same as the connection mode between the input allocation matrix and the cross-connect matrix. The fiber connection mode between the output port group and the output allocation matrix is the same as the connection mode between the input port group and the input allocation matrix.

In the optical switching apparatus provided in this embodiment of the present invention, wavelength adding/dropping and wavelength conversion ports on a tributary board are evenly allocated to the optical switches in the input allocation matrix and the output allocation matrix. In this case, in each optical switch, ⅔ ports are allocated to each wavelength channel from a line board, and the remaining ⅓ ports are allocated for wavelength adding/dropping and wavelength conversion functions of the tributary board.

The following describes a wavelength adding/dropping process of an optical switching apparatus provided by an embodiment of the present invention. FIG. 7-a is a schematic diagram of a wavelength dropping implementation manner of an optical switching apparatus according to an embodiment of the present invention. Because optical switches in an input allocation matrix and an output allocation matrix are shared optical switches in a same group, in wavelength dropping of optical signals, an intermediate cross-connect matrix may be skipped, and the optical signals are directly groomed from the input allocation matrix to a wavelength dropping port of the output allocation matrix, as shown by a dashed line in FIG. 7-a. If wavelength dropping ports in the optical switches of the corresponding output allocation matrix are used up, the optical signals are groomed through the intermediate cross-connect matrix to an optical switch of another output allocation matrix for wavelength dropping, as shown by a solid line in FIG. 7-a. When receiving a wavelength dropping request, the optical switching apparatus preferentially drops optical signals from a wavelength dropping channel indicated by the dashed line in FIG. 7-a, and implements dropping of optical signals of any wavelength in any dimension at any wavelength dropping port by using a wavelength dropping path indicated by the solid line. When a wavelength in an optical switch in a particular input allocation matrix needs to be dropped completely, one half of optical signals may be dropped through the path indicated by the dashed line, and the other half of optical signals may be dropped through the path indicated by the solid line.

FIG. 7-b is a schematic diagram of a wavelength adding implementation manner of an optical switching apparatus according to an embodiment of the present invention. Because optical switches in an input allocation matrix and an output allocation matrix are shared optical switches in a same group, in wavelength adding of optical signals, an intermediate cross-connect matrix may be skipped, and the optical signals are directly groomed from the output allocation matrix to a wavelength adding port of the input allocation matrix, as shown by a dashed line in FIG. 7-b. If wavelength adding ports in the optical switches of the corresponding input allocation matrix are used up, the optical signals are groomed through the intermediate cross-connect matrix to an optical switch in another input allocation matrix for wavelength adding, as shown by a solid line in FIG. 7-b. When receiving a wavelength adding request, the optical switching apparatus preferentially adds optical signals from a wavelength adding channel indicated by the dashed line in FIG. 7-b, and implements adding of optical signals of any wavelength in any dimension at any wavelength adding port by using a wavelength adding path indicated by the solid line. When a wavelength in an optical switch in a particular output allocation matrix needs to be added completely, one half of optical signals may be added through the path indicated by the dashed line, and the other half of optical signals may be added through the path indicated by the solid line.

When wavelength conversion is required, wavelength dropping may be implemented by using a particular path in FIG. 7-a, and after conversion is performed by a wavelength conversion board, wavelength adding is implemented by using a particular path in FIG. 7-b.

It should be noted that in this embodiment of the present invention, a proportion of line boards and tributary boards may be adjusted dynamically according to a proportion of wavelength adding/dropping and wavelength conversion on a node. When a proportion of wavelength adding/dropping is relatively high, a proportion of tributary boards may be increased For example, in a system that has 96 wavelengths in 8 dimensions and requires 50% wavelength adding/dropping, 8*96*(1+50%)=1152, and if a manner of the prior art is used, a 1152*1152 fully cross-connect optical switch is required, but currently, it may be difficult, or nearly impossible, to implement this according to the process in the industry. According to the solution provided by this embodiment of the present invention, only an optical switch having a maximum scale of 192*192 is required for implementation, and the optical switch of such a scale can already be implemented by some products in the industry.

Figure 8:
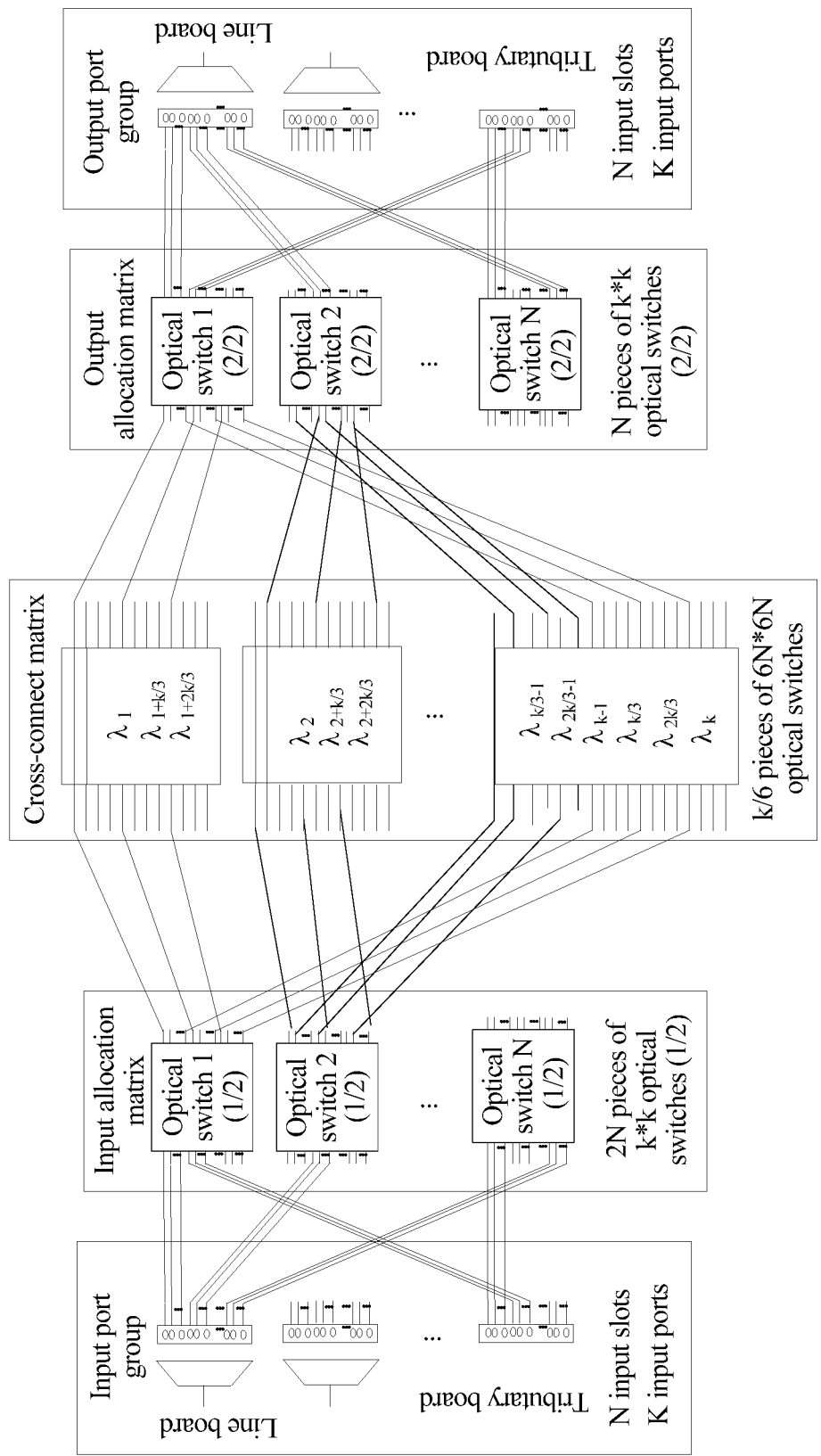
FIG. 8 is a schematic structural diagram of another optical switching apparatus according to an embodiment of the present invention.

When a maximum proportion of wavelength adding/dropping and wavelength conversion is 50%, referring to FIG. 8, FIG. 8 is a schematic structural diagram of another optical switching apparatus according to an embodiment of the present invention. In the example shown in FIG. 8, two adjacent second optical switches in K/3 second optical switches included in a cross-connect matrix are combined into one optical switch, and each combined optical switch corresponds to six wavelengths. Furthermore, each first optical switch in N first optical switches included in an input allocation matrix is split into two optical switches, and each split optical switch is connected to each combined optical switch.

In this embodiment of the present invention, two adjacent optical switches in the cross-connect matrix may be combined into one, that is, one optical switch in the cross-connect matrix corresponds to six wavelengths. At the same time, one optical switch in an input allocation matrix is split into two. There are still only three fibers used to connect one optical switch in the input allocation matrix and one optical switch in the cross-connect matrix. No change is made to an optical slot position group. The fiber connection mode and a grooming method between the input allocation matrix and the cross-connect matrix are basically consistent with those in the foregoing embodiment. After optical switches in the input allocation matrix and the output allocation matrix are split, scales of the optical switches in the input allocation matrix and the output allocation matrix may be further reduced. For example, in a system that has 96 wavelengths in 8 dimensions and requires 50% wavelength adding/dropping, in an implementation manner of this embodiment of the present invention, the input allocation matrix and the output allocation matrix require only an optical switch having a maximum of 96*96 for implementation. Certainly, for the optical switching apparatus shown in FIG. 8 in this embodiment of the present invention, the optical switches may be further split, so that the scales of the optical switches may be further reduced.

Figure 9:
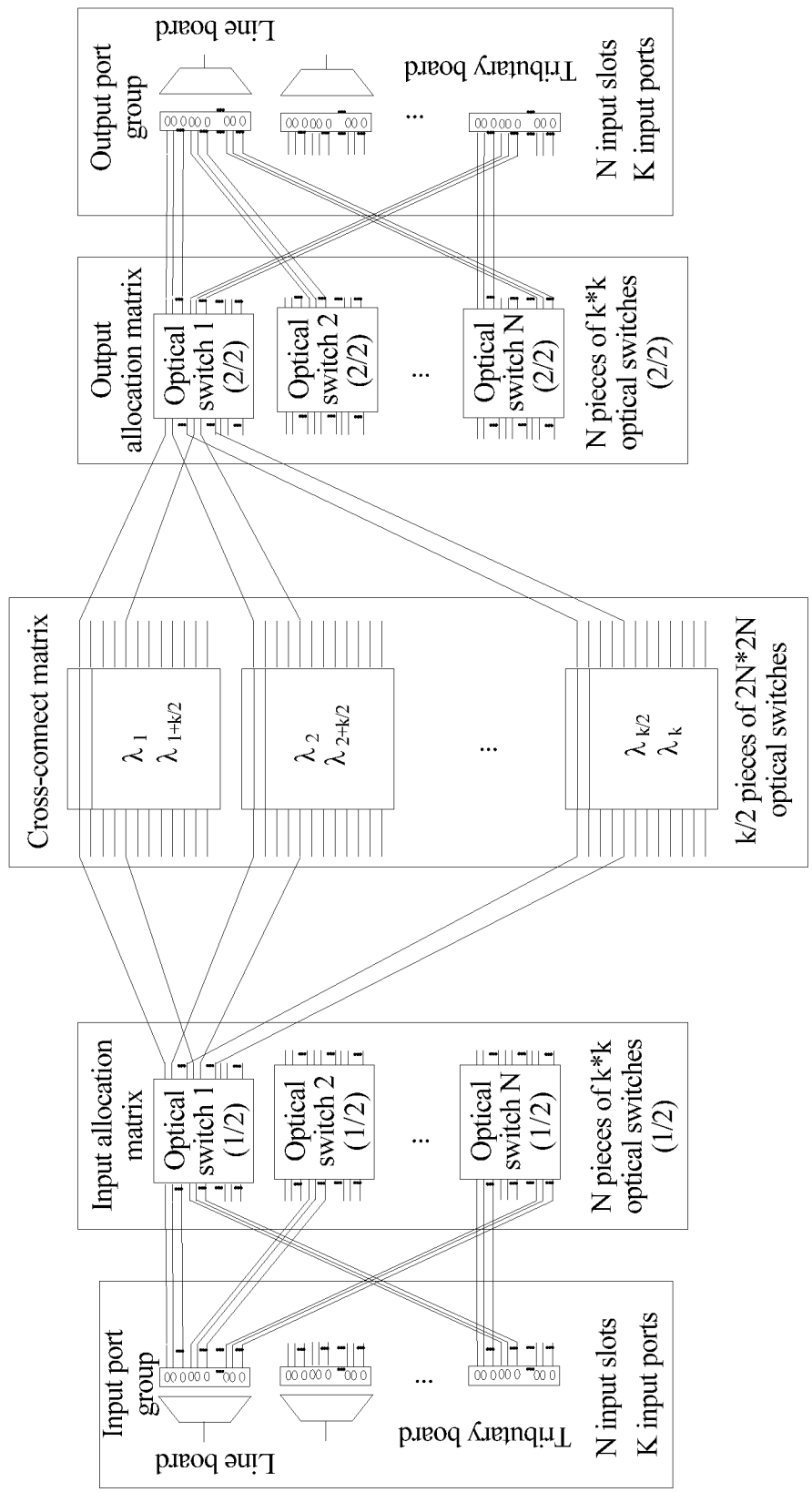
FIG. 9 is a schematic structural diagram of another optical switching apparatus according to an embodiment of the present invention.

FIG. 9 is a schematic structural diagram of another optical switching apparatus according to an embodiment of the present invention, where the following are provided.

An input port group includes N input slots, and K input ports are provided in each input slot, where N/2 input slots are configured to input optical signals in each dimension, and N/2 input slots are configured to input an optical signal that requires wavelength adding or an optical signal obtained after wavelength conversion, where the N and K are both non-zero natural numbers.

An input allocation matrix includes N first optical switches, an input port quantity of the first optical switch is K, an output port quantity of the first optical switch is K, and the K input ports of each input slot are connected to input ports of the N first optical switches.

A cross-connect matrix includes K/2 second optical switches, an input port quantity of the second optical switch is 2N, an output port quantity of the second optical switch is 2N, each second optical switch corresponds to two wavelengths, and the K output ports of each first optical switch are connected to the K/2 second optical switches.

An output allocation matrix includes N third optical switches, an input port quantity of the third optical switch is K, an output port quantity of the third optical switch is K, and the K input ports of each third optical switch are connected to the K/2 second optical switches.

An output port group includes N output slots, K output ports are provided in each output slot, the K output ports of each output slot are connected to the N third optical switches, N/2 output slots are configured to output optical signals in each dimension, and N/2 output slots are configured to output an optical signal that requires wavelength dropping or an optical signal that requires wavelength conversion.

In this embodiment of the present invention, assuming that the optical switching apparatus supports K wavelengths, the optical switching apparatus has N slots, where a line board may be inserted for dimensional grooming, or a tributary board may be inserted for wavelength adding/dropping, or wavelength adding/dropping and wavelength conversion are performed in a wavelength convergence conversion board. K input ports and K output ports are provided in each slot. For ease of description, slots are classified into two types: input slots and output slots. Each slot provides K ports.

In this embodiment of the present invention, a connection mode between the input allocation matrix and the cross-connect matrix is: each optical switch of the input allocation matrix includes K output ports, which are respectively connected to K/2 optical switches of the cross-connect matrix. Two ports in each optical switch of the input allocation matrix are connected to each optical switch of the cross-connect matrix. A connection mode between the output allocation matrix and the cross-connect matrix is the same as the connection mode between the input allocation matrix and the cross-connect matrix. A fiber connection mode between the output port group and the output allocation matrix is the same as a connection mode between the input port group and the input allocation matrix.

The input allocation matrix is connected to the input port group in fiber cross-connection mode. The N input slots included in the input port group are a first input slot, a second input slot, and so on, until an $N^{th}$ input slot. There are K input ports in each input slot are grouped into N groups. The N groups of input ports in each input slot are respectively a first group of input ports, a second group of input ports, and so on, until an $N^{th}$ group of input ports, and each group of input ports includes K/N input ports. The N first optical switches of the input allocation matrix are respectively a first one of the first optical switches, a second one of the first optical switches, and so on, until an $N^{th}$ one of the first optical switches.

For the first input slot, the first group of input ports of the first input slot is connected to the first one of the first optical switches, the second group of input ports of the first input slot is connected to the second one of the first optical switches, and so on, until the $N^{th}$ group of input ports of the first input slot is connected to the $N^{th}$ one of the first optical switches.

For the second input slot, the first group of input ports of the second input slot is connected to the second one of the first optical switches, the second group of input ports of the second input slot is connected to the third one of the first optical switches, and so on, until the $(N-1)^{th}$ group of input ports of the second input slot is connected to the $N^{th}$ one of the first optical switches, and the $N^{th}$ group of input ports of the second input slot is connected to the first one of the first optical switches.

For the $N^{th}$ input slot, the first group of input ports of the $N^{th}$ input slot is connected to the $N^{th}$ one of the first optical switches, the second group of input ports of the $N^{th}$ input slot is connected to the first one of the first optical switches, and so on, until the $(N-1)^{th}$ group of input ports of the second input slot is connected to the $(N-2)^{th}$ one of the first optical switches, and the $N^{th}$ group of input ports of the second input slot is connected to the $(N-1)^{th}$ one of the first optical switches.

Connecting the input allocation matrix and the input port group in the foregoing group interlacing mode may ensure that wavelengths input by each first optical switch of the input allocation matrix are different. For a brief description of group interlacing between the input allocation matrix and the input port group, refer to the contrast diagram of group interlacing between the input allocation matrix and the input port group as shown in FIG. 6. No further description is provided herein.

Figure 10:
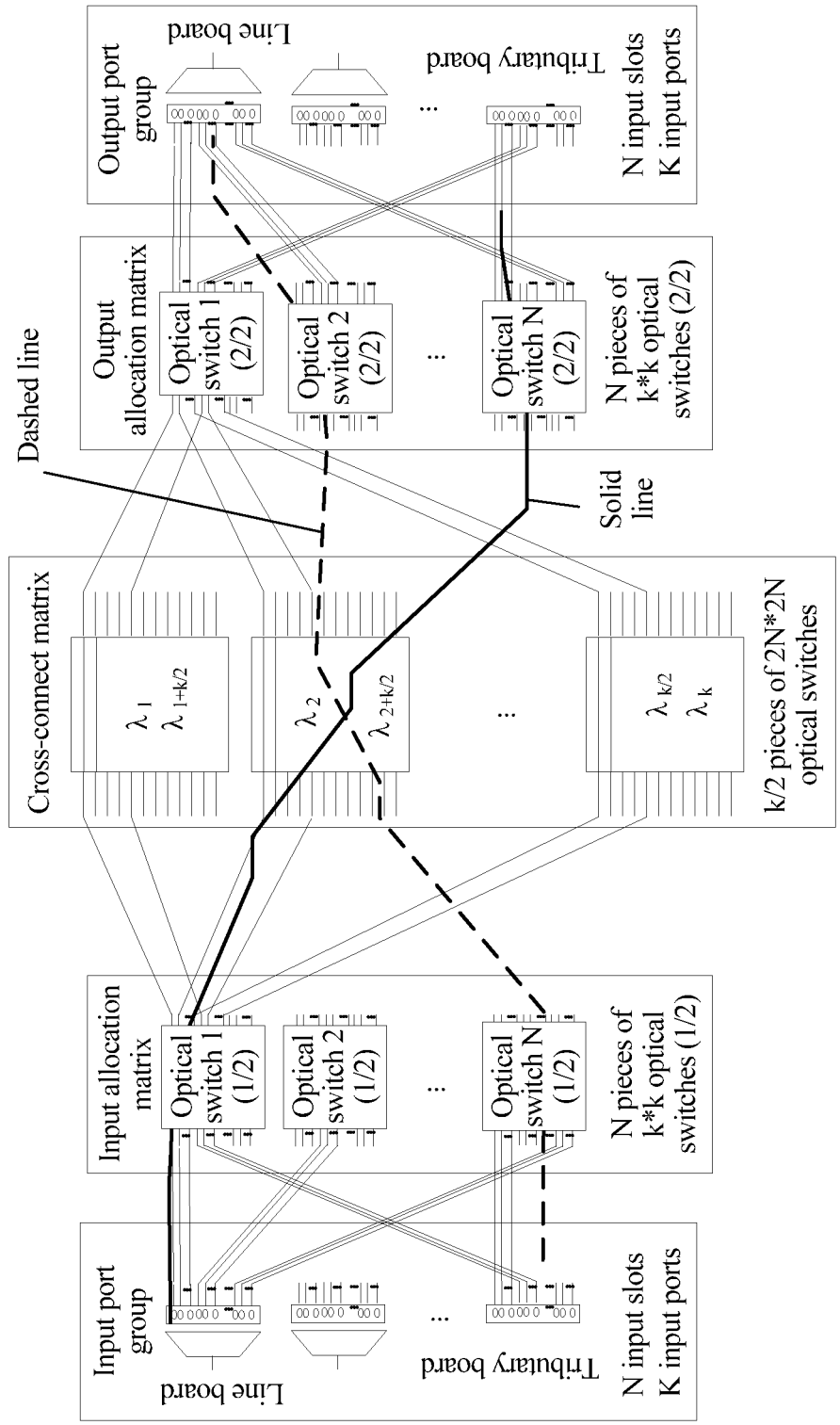
FIG. 10 is a schematic diagram of a wavelength adding/dropping implementation manner of an optical switching apparatus according to an embodiment of the present invention.

FIG. 10 is a schematic diagram of a wavelength adding/dropping implementation manner of an optical switching apparatus according to an embodiment of the present invention. N/2 line boards are inserted in input slots, and it is specified that one half of ports of optical switches in an input allocation matrix are used for dimensional grooming of optical signals. In addition, N/2 tributary boards may be configured and inserted in the input slots, or less than N/2 tributary boards are inserted in the input slots. Because optical switches in the input allocation matrix and an output allocation matrix are shared optical switches in a same group, in wavelength adding of optical signals, an intermediate cross-connect matrix may be skipped directly, and the optical signals are directly groomed from the output allocation matrix to a wavelength adding port of the input allocation matrix, as shown by a dashed line in FIG. 10. When receiving a wavelength adding request, the optical switching apparatus adds optical signals from a wavelength adding channel indicated by the dashed line in FIG. 10, and implements adding of optical signals of any wavelength in any dimension at any wavelength adding port by using a wavelength adding path indicated by the dashed line. When a wavelength in an optical switch in a particular output allocation matrix needs to be added completely, all optical signals may be added through the path indicated by the dashed line. Because the optical switches in the input allocation matrix and the output allocation matrix are shared optical switches in the same group, in wavelength dropping of optical signals, the intermediate cross-connect matrix may be skipped directly, and the optical signals are directly groomed from the input allocation matrix to a wavelength dropping port of the output allocation matrix, as shown by a solid line in FIG. 10. When receiving a wavelength dropping request, the optical switching apparatus drops optical signals from a wavelength dropping channel indicated by the solid line in FIG. 10, and implements dropping of optical signals of any wavelength in any dimension at any wavelength dropping port by using a wavelength dropping path indicated by the solid line. When wavelength conversion of optical signals is required, the optical signals are first dropped to a tributary board through the path indicated by the solid line in FIG. 10. Then the optical signals arrive at a wavelength convergence conversion board and undergo wavelength conversion. After the conversion is complete, the optical signals are added to a corresponding wavelength in a corresponding dimension through the path indicated by the dashed line shown in FIG. 10.

In use, a proportion of line boards and tributary boards may be dynamically adjusted for the optical switching apparatus in this embodiment of the present invention according to a proportion of wavelength adding/dropping and wavelength conversion on a node. When a proportion of wavelength adding/dropping is relatively high, a proportion of tributary boards may be increased. When a system has 80 wavelengths in 8 dimensions, 100% wavelength adding/dropping ports are reserved. If a fully cross-connect optical switch is used according to a manner of the prior art, a 1280*1280 optical switch is required, but the current process level in the industry still cannot meet this requirement. If the solution of this embodiment of the present invention is used for implementation, 32 pieces of 80*80 optical switches and 40 pieces of 32*32 optical switches are required, and this may be implemented according to the current process level in the industry.

The optical switching apparatus provided by the embodiments of the present invention has the following advantageous effects.

In the optical switching apparatus provided by the embodiments of the present invention, sharing of all wavelength adding/dropping and wavelength conversion ports is implemented for optical signals of all wavelengths in all dimensions, and usage efficiency of wavelength adding/dropping and wavelength conversion boards is improved. Therefore, given that a same proportion of wavelength adding/dropping and conversion boards is configured, a collision rate and a packet loss rate in the optical switching apparatus provided by the present disclosure are lower than those of a solution in which a wavelength adding/dropping and conversion board is configured for each dimension.

In the embodiments of the present invention, several small-scale optical switches are cross-connected to implement sharing of wavelength adding/dropping and wavelength conversion functions, and resolve a problem that a large-scale optical switch device cannot be obtained in a conventional solution using a single optical switch.

In the embodiments of the present invention, slot positions of all slots are completely the same. In actual use, a line board or a tributary board may be inserted in any slot position without affecting system performance. It is unnecessary to manually specify which slot positions for inserting which boards. The system is relatively simple.

Because ports are shared for wavelength adding/dropping and conversion in the embodiments of the present invention, in an actual application, wavelength adding/dropping and conversion boards may be added or reduced according to current service adding/dropping and a wavelength collision probability, and system flexibility is very high.

In the structural solution of the optical switching apparatus provided by the embodiments of the present invention, expansion and upgrade of switching nodes can be easily implemented. When system dimensions are added, smaller optical switches may still be used to implement node functions.

As can be learned from the foregoing descriptions of the embodiments of the present invention, an optical switching apparatus includes an input port group, an input allocation matrix, a cross-connect matrix, an output allocation matrix, and an output port group. The input port group includes multiple input slots, and multiple input ports are provided in each input slot. The input allocation matrix includes multiple first optical switches, and an input port of the first optical switch is connected to an input port of the input slot. The cross-connect matrix includes multiple second optical switches, and an output port of the first optical switch is connected to an input port of the second optical switch. The output allocation matrix includes multiple third optical switches, and an input port of the third optical switch is connected to an output port of the second optical switch. The output port group includes multiple output slots, multiple output ports are provided in each output slot, and an output port of the output slot is connected to an output port of the third optical switch. The input port group may transmit optical signals input in each dimension, to the input allocation matrix, and the input allocation matrix transmits the optical signals to the cross-connect matrix. Then the cross-connect matrix transmits the optical signals to the output allocation matrix, and finally the optical signals arrive at the output port group. In this way, grooming of the optical signals in each dimension is implemented. In addition, an optical signal that requires wavelength adding may be input to the optical switching apparatus through an input port of an input slot, and an optical signal obtained after wavelength conversion may also be input to the optical switching apparatus through an input port of an input slot. In addition, an optical signal that requires wavelength dropping may be output through an output port of an output slot, and an optical signal that requires wavelength conversion may also be output through an output port of an output slot. In this way, wavelength adding/dropping and wavelength conversion are implemented for optical signals. In the embodiments of the present invention, optical signals of each wavelength in each dimension can all be input from the input port group, and arrive at any output port of the output port group, and the ports of the optical switching apparatus are shared for dimensional grooming, wavelength adding/dropping, and wavelength conversion of the optical signals. Therefore, waste of port resources may be avoided, and utilization of port resources may be improved. In addition, the input allocation matrix, the cross-connect matrix, and the output allocation matrix are all implemented by using several optical switches, and input ports and output ports are provided in all the optical switches. Therefore, a problem of impossible implementation due to very great process difficulty caused by too many ports in a single optical switch may be resolved, and flexibility is relatively high. The optical signals of each wavelength in each dimension can all be input from the input port group, and arrive at any output port of the output port group. Therefore, during dimensional grooming, wavelength adding/dropping, and wavelength conversion, the optical signals may always arrive at any output port of the output port group, which can reduce a packet loss rate.

It should be noted that, for brevity, each of the foregoing method embodiments for optical signal transmission is described as a series of actions, but persons skilled in the art should be aware that the present disclosure is not limited by a sequence of the actions described, because according to the present disclosure, some steps may be performed according to another sequence or performed simultaneously. In addition, persons skilled in the art should also understand that all the embodiments described in this specification belong to exemplary embodiments, and the involved actions and modules are not necessarily mandatory to the present invention.

In addition, it should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments provided by the present disclosure, connection relationships between the modules indicate that the modules have communication connections with each other, which may be implemented as one or more communications buses or signal cables. Persons of ordinary skill in the art may understand and implement the embodiments of the present invention without creative efforts.

Based on the description of the foregoing implementation manners, persons skilled in the art may clearly understand that the present disclosure may be implemented by software in addition to necessary universal hardware, or by dedicated hardware, including an application-specific integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation manner in most cases. Based on such an understanding, the technical solutions of the present disclosure essentially or the part contributing to the prior art may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of the present invention.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An optical switching apparatus, comprising:
an input port group;
an input allocation matrix;
a cross-connect matrix;
an output allocation matrix; and
an output port group,
wherein the input port group comprises a plurality of input slots, each input slot of the plurality of input slots comprising a plurality of input ports, the plurality of input slots being configured to input optical signals in each dimension, or configured to input an optical signal that requires wavelength adding, or configured to input an optical signal obtained after wavelength conversion,
wherein the input allocation matrix is connected to the input port group in a fiber cross-connection mode, the input allocation matrix comprising a plurality of first optical switches, an input port of the plurality of first optical switches being connected to an input port of the plurality of input slots,
wherein the cross-connect matrix comprises a plurality of second optical switches, the plurality of second optical switches corresponding to one or more wavelengths, an input port of the plurality of second optical switches being connected to an output port of the plurality of first optical switches,
wherein the output allocation matrix comprises a plurality of third optical switches, an input port of the plurality of third optical switches being connected to an output port of the plurality of second optical switches, and
wherein the output port group is connected to the output allocation matrix in a fiber cross-connection mode, the output port group comprising a plurality of output slots, each output slot of the plurality of output slots comprising a plurality of output ports, an output port of the plurality of output slots being connected to an output port of the plurality of third optical switches, and the plurality of output slots being configured to output optical signals in each dimension, or configured to output an optical signal that requires wavelength dropping, or configured to output an optical signal that requires wavelength conversion.

2. The apparatus according to claim 1, wherein the input allocation matrix being connected to the input port group in a fiber cross-connection mode comprises:
the plurality of input ports of each input slot of the plurality of input slots being grouped into a plurality of groups, each group of the plurality of input ports of a given input slot of the plurality of input slots being connected to a first optical switch of the input allocation matrix, and the plurality of groups of the given input slot being respectively connected to each first optical switch of the input allocation matrix in an interlacing mode.

3. The apparatus according to claim 1, wherein the output port group being connected to the output allocation matrix in a fiber cross-connection mode comprises:
the plurality of output ports of each output slot of the plurality of output slots being grouped into a plurality of groups, each group of the plurality of output ports of a given output slot of the plurality of output slots being connected to a third optical switch of the output allocation matrix, and the plurality of groups of the given input slot being respectively connected to each third optical switch of the output allocation matrix in an interlacing mode.

4. The apparatus according to claim 1, wherein the plurality of input slots are classified into a first type of input slot and a second type of input slot, wherein the first type of input slot is configured to input an optical signal that requires dimensional grooming, and wherein the second type of input slot is configured to input an optical signal that requires wavelength adding or an optical signal obtained after wavelength conversion.

5. The apparatus according to claim 4, wherein the second type of input slot comprises a wavelength adding input slot and a conversion input slot, wherein the wavelength adding input slot is configured to input an optical signal that requires wavelength adding, and the conversion input slot is configured to input an optical signal obtained after wavelength conversion.

6. The apparatus according to claim 1, wherein the plurality of output slots comprised in the output port group are classified a first type of output slot and a second type of output slot, wherein the first type of output slot is configured to output an optical signal that requires dimensional grooming, and wherein the second type of output slot is configured to output an optical signal that requires wavelength dropping or an optical signal that requires wavelength conversion.

7. The apparatus according to claim 6, wherein the second type of output slot comprises a wavelength dropping output slot and a conversion output slot, wherein the wavelength dropping input slot is configured to output an optical signal that requires wavelength dropping, and the conversion output slot is configured to output an optical signal that requires wavelength conversion.

8. The apparatus according to claim 1, wherein when the second optical switch corresponds to M wavelengths, M fibers are used to connect the input ports of the plurality of second optical switches and the output ports of the plurality of first optical switches, wherein M is a non-zero natural number.

9. The apparatus according to claim 1, wherein a first optical switch of the plurality of first optical switches of the input allocation matrix and a third optical switch of the plurality of third optical switches of the output allocation matrix are a same optical switch, wherein an input port of the first optical switch of the plurality of first optical switches and an output port of the third optical switch of the plurality of third optical switches are an input port of the same optical switch, and an output port of the first optical switch of the plurality of first optical switches and an input port of the third optical switch of the plurality of third optical switches are an output port of the same optical switch.

10. The apparatus according to claim 1, wherein every T second optical switches of the plurality of second optical switches of the cross-connect matrix are combined into one optical switch, wherein each first optical switch in the plurality of first optical switches of the input allocation matrix is split into T optical switches, wherein each split optical switch is connected to each combined optical switch, and wherein the T is a non-zero natural number.

11. The apparatus according to claim 1, wherein the input port group comprises N input slots, and K input ports are provided in each input slot, wherein 2N/3 input slots are configured to input optical signals in each dimension, and N/3 input slots are configured to input an optical signal that requires wavelength adding or an optical signal obtained after wavelength conversion, wherein the N and K are both non-zero natural numbers.

12. The apparatus according to claim 11, wherein the input allocation matrix comprises N first optical switches, an input port quantity of each first optical switch is 2K, an output port quantity of each first optical switch is 2K, and the 2K input ports of each input slot are connected to input ports of the N first optical switches.

13. The apparatus according to claim 12, wherein the cross-connect matrix comprises K/3 second optical switches, an input port quantity of the second optical switch is 3N, an output port quantity of the second optical switch is 3N, each second optical switch corresponds to three wavelengths, and the 2K output ports of each first optical switch are connected to the K/3 second optical switches.

14. The apparatus according to claim 13, wherein two adjacent second optical switches in the K/3 second optical switches are combined into one optical switch, each combined optical switch corresponds to six wavelengths, each first optical switch in the N first optical switches comprised in the input allocation matrix is split into two optical switches, and each split optical switch is connected to each combined optical switch.

15. The apparatus according to claim 13, wherein the output allocation matrix comprises N third optical switches, an input port quantity of the third optical switch is 2K, an output port quantity of the third optical switch is 2K, and the 2K input ports of each third optical switch are connected to the K/3 second optical switches.

16. The apparatus according to claim 15, wherein the output port group comprises N output slots, K output ports are provided in each output slot, the K output ports of each output slot are connected to the N third optical switches, 2N/3 output slots are configured to output optical signals in each dimension, and N/3 output slots are configured to output an optical signal that requires wavelength dropping or an optical signal that requires wavelength conversion.

17. An apparatus, comprising:
an input port group;
an input allocation matrix;
a cross-connect matrix;
an output allocation matrix; and
an output port group,
wherein the input port group comprises N input slots, and K input ports are provided in each input slot, wherein N/2 input slots are configured to input optical signals in each dimension, and N/2 input slots are configured to input an optical signal that requires wavelength adding or an optical signal obtained after wavelength conversion, wherein the N and K are both non-zero natural numbers,
wherein the input allocation matrix is connected to the input port group in a fiber cross-connection mode, the input allocation matrix comprising N first optical switches, an input port quantity of the first optical switch is K, an output port quantity of the first optical switch is K, and the K input ports of each input slot are connected to input ports of the N first optical switches
wherein the cross-connect matrix comprises K/2 second optical switches, an input port quantity of the second optical switch is 2N, an output port quantity of the second optical switch is 2N, each second optical switch corresponds to two wavelengths, and the K output ports of each first optical switch are connected to the K/2 second optical switches,
wherein the output allocation matrix comprises N third optical switches, an input port quantity of the third optical switch is K, an output port quantity of the third optical switch is K, and the K input ports of each third optical switch are connected to the K/2 second optical switches, and wherein the output port group is connected to the output allocation matrix in a fiber cross-connection mode, the output port group comprising N output slots, K output ports are provided in each output slot, the K output ports of each output slot are connected to the N third optical switches, N/2 output slots are configured to output optical signals in each dimension, and N/2 output slots are configured to output an optical signal that requires wavelength dropping or an optical signal that requires wavelength conversion.

18. The apparatus according to claim 17, wherein the input allocation matrix being connected to the input port group in a fiber cross-connection mode comprises:

the input port group comprising N input slots, the N input slots being respectively a first input slot, a second input slot, until an $N^{th}$ input slot, wherein K input ports in each input slot are grouped into N groups, the N groups of input ports in each input slot being respectively a first group of input ports, a second group of input ports, until an $N^{th}$ group of input ports, each group of input ports comprising K/N input ports, wherein N first optical switches of the input allocation matrix are respectively a first one of the first optical switches, a second one of the first optical switches, until an $N^{th}$ one of the first optical switches, wherein the N and K are both non-zero natural numbers, wherein, for the first input slot, the first group of input ports of the first input slot is connected to the first one of the first optical switches, the second group of input ports of the first input slot is connected to the second one of the first optical switches, and the $N^{th}$ group of input ports of the first input slot is connected to the $N^{th}$ one of the first optical switches, wherein, for the second input slot, the first group of input ports of the second input slot is connected to the second one of the first optical switches, the second group of input ports of the second input slot is connected to the third one of the first optical switches, and the $(N-1)^{th}$ group of input ports of the second input slot is connected to the $N^{th}$ one of the first optical switches, and the $N^{th}$ group of input ports of the second input slot is connected to the first one of the first optical switches, and wherein, for the $N^{th}$ input slot, the first group of input ports of the $N^{th}$ input slot is connected to the $N^{th}$ one of the first optical switches, the second group of input ports of the $N^{th}$ input slot is connected to the first one of the first optical switches, the $(N-1)^{th}$ group of input ports of the second input slot is connected to the $(N-2)^{th}$ one of the first optical switches, and the $N^{th}$ group of input ports of the second input slot is connected to the $(N-1)^{th}$ one of the first optical switches.

19. The apparatus according to claim 17, wherein the output port group being connected to the output allocation matrix in a fiber cross-connection mode comprises:

the output port group comprising N output slots, the N output slots being respectively a first output slot, a second output slot, until an $N^{th}$ output slot, wherein K output ports in each output slot are grouped into N groups, the N groups of output ports in each output slot being respectively a first group of output ports, a second group of output ports, until an $N^{th}$ group of output ports, each group of output ports comprising K/N output ports, wherein N third optical switches of the output allocation matrix are respectively a first one of the third optical switches, a second one of the third optical switches, until an $N^{th}$ one of the third optical switches, wherein the N and K are both non-zero natural numbers, wherein, for the first output slot, the first group of output ports of the first output slot is connected to the first one of the third optical switches, the second group of output ports of the first output slot is connected to the second one of the third optical switches, and the $N^{th}$ group of output ports of the first output slot is connected to the $N^{th}$ one of the third optical switches, wherein, for the second output slot, the first group of output ports of the second output slot is connected to the second one of the third optical switches, the second group of output ports of the second output slot is connected to the third one of the third optical switches, and the $(N-1)^{th}$ group of output ports of the second output slot is connected to the $N^{th}$ one of the third optical switches, and the $N^{th}$ group of output ports of the second output slot is connected to the first one of the third optical switches, and wherein, for the $N^{th}$ output slot, the first group of output ports of the $N^{th}$ output slot is connected to the $N^{th}$ one of the third optical switches, the second group of output ports of the $N^{th}$ output slot is connected to the first one of the third optical switches, and the $(N-1)^{th}$ group of output ports of the second output slot is connected to the $(N-2)^{th}$ one of the third optical switches, and the $N^{th}$ group of output ports of the second output slot is connected to the $(N-1)^{th}$ one of the third optical switches.

20. The apparatus according to claim 17, wherein the N input slots are classified into a first type of input slot and a second type of input slot, wherein the first type of input slot is configured to input an optical signal that requires dimensional grooming, and wherein the second type of input slot is configured to input an optical signal that requires wavelength adding or an optical signal obtained after wavelength conversion.

* * * * *